(12) United States Patent
Kawashima et al.

(10) Patent No.: US 7,233,714 B2
(45) Date of Patent: Jun. 19, 2007

(54) PLANAR OPTICAL WAVEGUIDE CIRCUIT TYPE VARIABLE ATTENUATOR

(75) Inventors: Hiroshi Kawashima, Tokyo (JP); Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/352,373

(22) Filed: Feb. 13, 2006

(65) Prior Publication Data
US 2006/0204201 A1 Sep. 14, 2006

Related U.S. Application Data

(63) Continuation of application No. PCT/JP2004/011700, filed on Aug. 13, 2004.

(30) Foreign Application Priority Data
Aug. 13, 2003 (FR) .............................. 2003-207503

(51) Int. Cl.
G02B 6/12 (2006.01)
G02F 1/035 (2006.01)
G02F 1/295 (2006.01)

(52) U.S. Cl. .................. 385/14; 385/3; 385/4; 385/140

(58) Field of Classification Search .................... None
See application file for complete search history.

(56) References Cited

U.S. PATENT DOCUMENTS 6,072,924 A * 6/2000 Sato et al. ..................... 385/18

(Continued)

FOREIGN PATENT DOCUMENTS

JP 10-73775 3/1998

(Continued)

OTHER PUBLICATIONS

Matsubara, et al., "PLC-Type Variable Optical Attenuator With Low Power Consumption and Low Polarization Dependent Loss", The Institute of Electronics, Information and Communication Engineers, Mar. 3, 2003, p. 215.

(Continued)

Primary Examiner—Rodney Bovernick
Assistant Examiner—Omar Rojas
(74) Attorney, Agent, or Firm—Oblon, Spivak, McClelland, Maier & Neustadt, P.C.

(57) ABSTRACT

Provided is a planar optical waveguide circuit type variable attenuator capable of light attenuation by an arbitrary value in a range from 0 to 10 dB and also by not less than 30 dB, which is small-sized and is of power saving type. The attenuator is composed of a Mach-Zehnder interferometer circuit 30 having input waveguides 1a, 1b and an output waveguide 1d which are formed on an optical waveguide layer 3, and comprises a slit 12 formed on the waveguide layer in a longitudinally intermediate part of at least one of the optical waveguides 1a, 1b, 1d and in a direction crossing the optical waveguides 1a, 1b, 1d, and matching medium displacing means 16a, 16b for displacing index-matching medium 13 in a part of the slit 12 from a position including a path of propagation light in the optical waveguides 1a, 1b, 1d, and a position retracted from the path of propagation light.

22 Claims, 11 Drawing Sheets

U.S. PATENT DOCUMENTS 6,240,221 B1 * 5/2001 Thompson .................. 385/14

FOREIGN PATENT DOCUMENTS

| JP | 2002-196268 | 7/2002 |
|---|---|---|
| JP | 2002-267862 | 9/2002 |
| JP | 2002-303745 | 10/2002 |
| JP | 2003114358 | 4/2003 |

OTHER PUBLICATIONS

Y. Hashizume, et al., "PLC-Type Variable Optical Attenuator With Low Polarizaiton Dependent Loss", The Institute of Electronics, Information and Communication Engineers, Mar. 7, 2001, C-3-64, p. 229.

* cited by examiner

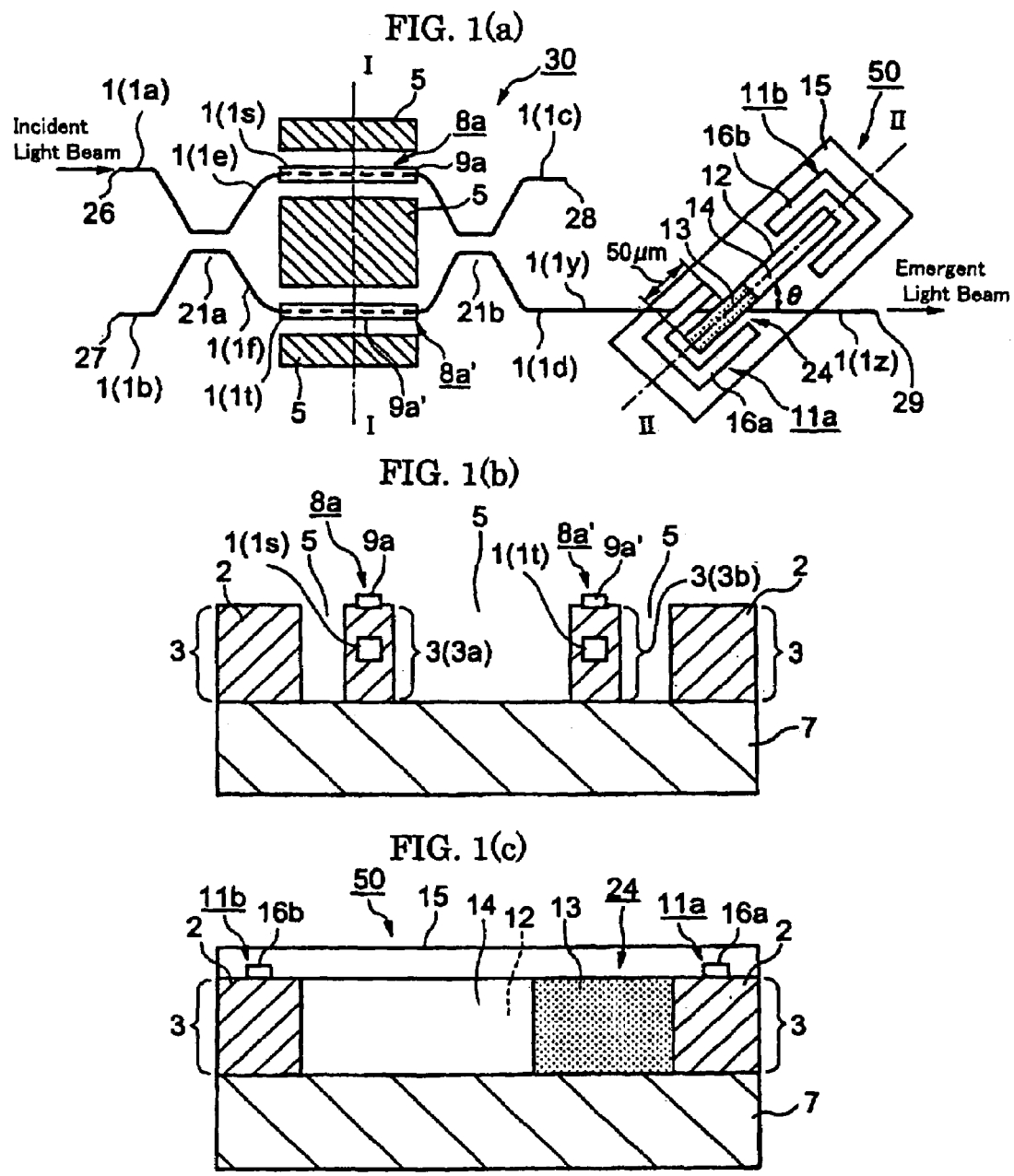

PRIOR ART

PLANAR OPTICAL WAVEGUIDE CIRCUIT TYPE VARIABLE ATTENUATOR

TITLE OF THE INVENTION

BACKGROUND OF THE INVENTION

1. Technical Field

The present invention relates to a planar optical waveguide circuit type variable attenuator used in an optical communication field or the like.

2. Description of the Related Art

For example, a planar optical waveguide circuit type variable attenuator has been used as an optical variable attenuator for optical communication or the like. The planar optical waveguide circuit type variable attenuator is composed of an optical waveguide layer formed on a substrate made of silicon or the like. The optical waveguide layer has cores and a clad (refer to, for example, a nonpatent document 1).

FIG. 10(a) is a plan view illustrating the configuration of an optical waveguide circuit type variable attenuator using a Mach-Zehnder interferometer circuit 30, and FIG. 10(b) is a sectional view along line VIII—VIII in FIG. 10(a). As shown in FIG. 10(b), an optical waveguide layer 3 formed on a substrate 7 made of silicon or the like, is composed of cores (optical waveguides) 1 and a clad 2 surrounding the cores 1. In the planar optical waveguide circuit type variable attenuator shown in FIG. 10(a), the cores 1 constitute the Mach-Zehnder interferometer circuit 30.

The Mach-Zehnder interferometer circuit 30 has at least one (two in this case) input optical waveguide 1a, 1b, an optical branch portion 21a for causing branching of a light beam inputted from the input light waveguides 1a, 1b, at least one (two in this case) output optical waveguide 1c, 1d, an optical coupling portion 21b provided on the input side of the output light guide waves 1a, 1b, for coupling light beams, and two connection optical guide waves 1e, 1f which connect the optical coupling portion 21b and the optical branch portion 21a together and which are arranged in parallel with and are spaced from each other.

In the Mach-Zehnder interferometer circuit 30 shown in this Figure, the optical branch portion 21a and the optical coupling portion 21b are formed respectively close to two cores 1 arranged in parallel with each other and formed by 2×2 direction coupler.

Further, in the optical circuit device shown in FIG. 10(a), the two connection optical waveguides 1e, 1f of the Mach-Zehnder interferometer circuit 30 are formed respectively therein with phase adjusting means 8a, 8a' for adjusting phases of light beams transmitted through the optical connection waveguides 1e, 1f. These phase adjusting means 8a, 8a' are formed of, for example, thin film heaters 9a, 9a' and are provided on the upper side of the clad 2.

The phase adjusting means 8a, 8a' and phase part connection optical waveguides 1s, 1t formed underneath a zone where the phase adjusting means 8a, 8a' are formed, constitute phase shifters. It is noted that reference numeral 23 denotes power supply electrodes for the thin film heaters 9a, 9a'. The phase adjusting means 8a, 8a' have one and the same configuration, and accordingly, when, for example, the phase adjusting means 8a alone is energized, the following operation is effected.

That is, in the planar waveguide circuit type variable attenuator shown in FIG. 10, when the temperature of the phase part connecting waveguide 1s is locally changed under control by the thin film heater 9a serving as the phase adjusting means 8a, the refractive index of the phase connection optical waveguide 1s on the side where the above-mentioned temperature is changed, is changed and accordingly, the effective refractive index of the core 1 in the part where the refractive index is changed is changed. That is, a thermooptical effect having such an phenomenon that the refractive index of quartz glass or the like is changed depending upon a temperature, is utilized, and with this effect, the phase of the light beam transmitted through the core whose refractive index is changed, is changed. Thus, a phase difference is caused between the light beam transmitted through the phase part connecting optical waveguide 1s and the light beam transmitted through the phase part connecting optical waveguide 1t, that is, the light beams transmitted through the optical connection waveguides 1e, if have a phase difference therebetween.

Namely, due to the themooptical effect caused by a heat generated by the thin film heater 9a serving as the phase adjusting means 8a, the effective optical waveguide length of the thus heated phase part connection optical guide 1s is changed so that the phase of the light beam transmitted through the core having the thus changed effective optical guide wave length is changed, and accordingly, the light transmittance of the Mach-Zehnder interferometer circuit 30 can be changed. Thus, the optical circuit device shown in FIG. 10(a) can be used as an optical waveguide circuit type interferometer capable of changing a light transmittance and an optical branching ratio so as to have a function of an optical variable attenuator. It is noted that the phase adjusting means 8a' is provided as a back-up one adapted to be used when, for example, the phase adjusting means 8a fails.

In this planar optical guide wave type variable attenuator, since the refractive index of quartz glass from which the cores 1 are formed, has a temperature coefficient dn/dT of $10^{-5}$ (1/° C.), if the temperature of the core 1 is increased by 20° C. over a length of, for example 5 mm, the effective optical length of the core 1 varies about 1 µm.

FIG. 11 shows a characteristic curve a which exhibits a relationship between an applied power and an insertion loss in the planar optical waveguide circuit type variable attenuator shown in FIG. 10. In view of this characteristic curve a, it is understood that a light attenuation value of about 10 dB is obtained by an applied power of about 430 mW, and a maximum attenuation value of 22.5 dB is obtained by an applied power of about 520 mW. FIG. 11 also shows a characteristic curve b which exhibits a relationship between an applied power and a difference (PDL: polarization-dependence loss) due to a polarization (TE-polarization and TM-polarization) of the insertion loss in the planar optical waveguide circuit type variable attenuator shown in FIG. 10. In view of the characteristic curve a and the characteristic curve b, it is understood that a difference caused by the polarization of an insertion loss is about −2 dB when the optical attenuation value is about 10 dB.

The optical variable attenuator as stated above is used in a light wavelength multiplex transmission (WDM) system, for example, in a main network of an optical communication system. In the WDM system, although a rare earth added optical fiber amplifier is used for simultaneously amplifying a plurality of light wave beams, since the optical amplifying efficiency has a wavelength characteristic, a difference in light intensity is caused, depending upon a wavelength. Further, since a specified light wave beam is separated or inserted, intermediary of a transmission path, a difference in light intensity is also caused, depending upon a wavelength in this case."

Thus, an optical variable attenuator is used in order to enable differences in light intensity to be precisely and dynamically uniform. Since the difference in light intensity depending upon a wavelength is in a range from 0 to 10 dB, a range of light attenuation value usually required for the optical variable attenuator is from 0 to about 10 dB see e.g., "Development of Variable Attenuator" by Sumimoto and others, Showa Electric Wire Review Vol. 52, No. 1(202).

SUMMARY OF THE INVENTION

By the way, in the above-mentioned WDM system during maintenance of a communication unit or during a rest of a specified channel alone, there would be caused such a case that a large attenuation value such as not less than 30 dB is required. However, it is not required to precisely control the WDM system when the system is operated with this large attenuation value. Thus, there has been desired to provide a planar optical waveguide circuit type variable attenuator which may accurately obtain an arbitrary optical attenuation value in an optical attenuation range from about 0 to 10 dB while which may also obtain a large attenuation value of not less than 30 dB.

However, the planar optical waveguide circuit type variable attenuator using the above-mentioned Mach-Zehnder interferometer circuit 30 may satisfactorily obtain an attenuation value in a range from about 0 to 10 dB, which is required during normal use, but it can hardly obtain a large attenuation value of more than 30 dB. That is, since the Mach-Zehnder interferometer circuit 30 obtains an attenuation value with the use of interference, it is difficult to obtain a large attenuation value of, for example, not less than 30 dB since a maximum attenuation value which can be stably obtained is limited to, for example, about 20 dB.

Thus, in order to solve the above-mentioned problem, that is, in order to provide a configuration which may obtain a maximum attenuation value of not less than 30 dB, there may be considered the provision of, for example, two conventional planar optical waveguide circuit type variable attenuators which are connected in series so as to obtain an overall optical attenuation value which is the sum of optical attenuation values of the respective planar optical waveguide circuit type attenuators.

However, since these two planar optical waveguide circuit type variable attenuators should be both set so as to obtain maximum optical attenuation values, a power which is two times as high as a power required for obtain a maximum attenuation value of a conventional planar optical waveguide circuit type variable attenuator would be required. Thus, an optical variable attenuator for an optical path through which no optical communication carried out requires a maximum power during, e.g. maintenance of a communication unit, there has been caused such a problem that useless power consumption becomes excessive so as to be impracticable.

Further, in view of the planer optical waveguide circuit type variable attenuator having the above-mentioned configuration in which two conventional planar optical waveguide circuit type variable attenuators are connected in series, there may be caused such a problem that the circuit size becomes about twice.

Measures to Solve the Problems

In order to solve the above-mentioned problems, according to the present invention, there are provided measures to solve the problems, having the following configuration:

To the end, according to a first aspect of the present invention, there is provided a configuration comprising a substrate, and an optical waveguide layer formed on the substrate and having cores and a clad, there are composed of, in the above-mentioned cores, a Mach-Zehnder interferometer circuit having at least one input optical waveguide, an optical branch portion for causing a light beam inputted from the input optical waveguide to branch, at least one output optical waveguide, an optical coupling portion located on the input side of the output optical waveguide, and two connection optical waveguides connecting the optical coupling portion and the optical branch portion therebetween and arranged in parallel with and spaced from each other, a phase adjusting means provided in at lease one of the two connection optical waveguides, for adjusting a phase of a transmitted light beam, a slit formed in the optical waveguide layer in a direction crossing this optical waveguide in a longitudinally intermediate part of at least one of the input optical waveguide and the output optical guide wave, a liquid index-matching medium charged in a part of the slit and having a refractive index approximately equal to a refractive index of the cores, and a matching material displacing means for displacing the index matching medium in the slit to either a position which contains an optical path for a transmitted light beam in at least one of the input optical waveguide and the output waveguide, or a position which is out of the optical path for the transmitted light beam.

Further, according to a second aspect of the present invention, there is provided, in addition to the configuration of the first aspect, such a configuration that the phase adjusting means provided respectively in the two connection optical waveguides, are the phase control means for carrying out such phase control that variation rates of polarization differences of phases of the light beams transmitted through the two connection optical waveguides are made to be different from each other.

Further, according to a third aspect of the present invention, there is provided, in addition to the configurations of the first and second aspects, such a configuration that the phase adjusting means provided respectively in the two connection optical waveguides are birefringence adjusting means for causing variation rates of birefringence values of the two connection optical waveguides to be different from each other.

Further, according to a fourth aspect of the present invention, there is provided, in addition to the configuration of the third aspect, such a configuration that a stress adjusting portion is provided, being spaced from a part formed therein with the phase adjusting means provided at least one of the two connection optical waveguides, for reliving or increasing a stress applied to the connection optical waveguide upon phase adjustment by the phase adjusting means.

Further, according to a fifth aspect of the present invention, there is provided, in addition to the configuration of the fourth aspect of the present invention, such a configuration that the stress adjusting portion is a free space spaced from the phase adjusting means, for relieving or increasing the stress applied to the connection optical waveguide upon phase adjustment by the phase adjusting means.

Further, according to a sixth aspect of the present invention, there is provided, in addition to any one of the configurations of the first to fifth aspects, such a configuration that the phase adjusting means respectively having heating means, are provided respectively in two connection optical waveguides, and a heat insulating means for constraining diffusion of a heat which is applied to the connection optical waveguides by the heating means, is formed in a zone spaced from a part where at least one of the phase adjusting means is formed.

Further, according to a seventh aspect of the present invention, there is provided, in addition to the configuration of the fifth aspect, such a configuration that optical waveguide removal portions formed by partly removing the optical waveguide layer are formed as free spaces along the longitudinal direction of the connection optical waveguides, in zones spaced from the connection optical waveguides in the optical waveguide layer, on opposite sides between which the part where the phase adjusting means is formed is interposed.

Further, according to an eighth aspect of the present invention, there is provided, in addition to the configuration of the seventh aspect, such a configuration that phase adjusting means are provided respectively in the two connection optical waveguides, having an optical waveguide removal portion formed at a first distance from the one of the connection optical waveguides, and another optical waveguide removal portion formed at a second distance which is different from the first distance, from the other one of the connection optical waveguides.

Further, according to a ninth aspect of the present invention, there is provided, in addition to the configuration of the sixth aspect, such a configuration that the heat insulation means is an optical waveguide removal part in which the optical waveguide layer is removed along the longitudinal direction of the connection optical waveguides, in a zone spaced from the connection optical waveguides.

Further, according to a tenth aspect of the present invention, there is provided, in addition to the configuration of the seventh aspect, such a configuration that one of the two connection optical waveguides which are arranged in parallel with each other is a first connection optical waveguide while the other one of them is a second connection optical waveguide, a first and a fourth phase adjusting means as the phase adjusting means are arranged in the first connection optical waveguide, being space from each other in the longitudinal direction thereof in that order, a third and a second phase adjusting mans as the phase adjusting means are arranged in the second connection optical waveguide, being space in the longitudinal direction thereof in that order, the first phase adjusting means having the same configuration as that of the third phase adjusting means, the second phase adjusting means having the same configuration as that of the fourth phase adjusting means, a first recess being formed as the optical waveguide removal portion on one side of the first phase adjusting means at a first distance from the latter, a third recess being formed as the optical waveguide removal portion on one side of the third phase adjusting means at a third distance from the latter, which is substantially equal to the first distance, a second recess being formed as the optical waveguide removal portion on one side of the second phase adjusting means at a second distance from the latter, which is different from the first distance, and a fourth recess being formed as the optical waveguide removal portion on one side of the fourth phase adjusting means at a fourth distance from the latter, which is substantially equal to the second distance.

Further, according to an eleventh aspect of the present invention, there is provide, in addition to any one of the configurations of the seventh to tenth aspects, such a configuration that the optical waveguide removal portions are formed by removing the optical waveguide layer from the front surface of the optical waveguide layer to the front surface of the substrate.

Further, according to a twelfth aspect of the present invention, there is provided, in addition to the configuration of the eleventh aspect, such a configuration that the substrate is formed therein with substrate removal portions which are continuous from the lower part of the optical waveguide removal portions.

Further, according to a thirteenth aspect of the present invention, there is provided, in addition to the configuration of the twelfth aspect, such a configuration that the substrate removal portions have a recess-like sectional shape, having widths wider than that of the lower parts of the optical waveguide removal portions.

Further, according to a fourteenth aspect of the present invention, there is provided, in addition to any one of the configurations of the first to thirteen aspects, such a configuration that the matching medium displacing means has a thin film heater provided around at least a part of the slit.

Further, according to a fifteenth aspect of the present invention, there is provided, in addition to any one of the configurations of the first to fourteenth aspects, such a configuration that the phase adjusting means have thin film heaters provided on the connection waveguides.

Further, according to a sixteenth aspect of the present invention, there is provided, in addition to any one of the configurations of the first to fifteenth aspects, such a configuration that the optical waveguide layer is made of quartz group glass.

Further, according to a seventeenth aspect of the present invention, there is provide, in addition to any one of the configurations of the first to sixteenth aspects, such a configuration that the substrate is a silicon substrate.

Further, according to an eighteenth aspect of the present invention, there is provide, in addition to any one of the configurations of the first to seventeenth aspects, such a configuration that the slit is sealed by a glass plate.

Further, according to a nineteenth aspect of the present invention, there is provided, in addition to the configuration of the eighteenth aspect, such a configuration that the glass plate is bonded to the optical waveguide layer by an adhesive around the slit.

Further, according to a 20-th aspect of the present invention, there is provided, in addition to the configuration of the eighteenth aspect, such a configuration that the glass plate is joined to the optical waveguide layer by low melting point glass around the slit.

Further, according to a 21-th aspect of the present invention, there is provided, in addition to the configuration of the eighteenth aspect, such a configuration that the glass plate and the optical waveguide layer interpose therebetween a metal film so as to be joined to each other through diffusion of metal constituting the metal film.

Further, according to a 22-th aspect of the present invention, there is provided, in addition to the configuration of the 21-th aspect, such a configuration that the metal film is made of either copper or copper alloy.

Further, according to a 23-th aspect of the present invention, there is provided, in addition to any one of the configurations of the first to 22-th aspects, such a configuration that inert gas is enclosed in the slit together with the index-matching medium.

Advantages of the Invention

As stated above, according to the present invention, the liquid index matching medium is charged in the slit which crosses the intermediate part of the output or input optical waveguide in the Mach-Zehnder interferometer circuit formed by the cores in the optical waveguide layer.

Further, through the phase adjustment of the Mach-Zehnder interferometer circuit in a condition in which the index matching medium is displaced to a position including the intermediate part, a light attenuation value may be accurately obtained in a range of, for example, 0 to 10 dB. This is because the index matching medium has a refractive index which is equal to or approximated to that of the cores in the optical waveguide layer.

Further, by retracting the index matching medium in the slit from the path of a light beam in the output or input optical waveguide, a very large light attenuation value such as not less than 35 dB may be obtained in the output or input optical waveguide.

Since the displacement of the matching medium in the slit may be effected by a small power and since the slit may be small-sized in comparison with the planer optical waveguide circuit type variable attenuator, a large light attenuating value may be obtained by a small-sized apparatus with a small power.

BRIEF DESCRIPTION OF THE DRAWINGS

FIG. 1(a) is a view illustrating a configuration of an essential part of a first embodiment of a planar optical waveguide circuit type variable attenuator according to the present invention, FIG. 1(b) is a sectional view along line I—I in FIG. 1(a);

FIG. 1(c) is a sectional view along line II—II in FIG. 1(a);

REFERENCE OF THE NUMERALS

Figure 2A:
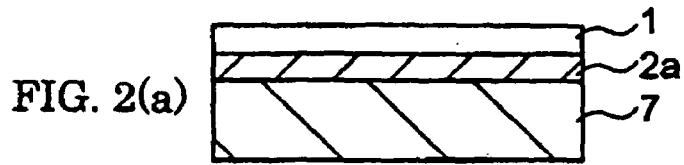
FIGS. 2(a) to 2(e) are sectional views along line I—I in FIG. 1(a), for explaining manufacturing steps of the planar optical waveguide circuit type variable attenuator in the first embodiment according to the present invention.

1: core (optical waveguide)
1a, 1b: input optical waveguide
1c, 1d: output optical waveguide
1e, 1f: connection optical waveguides
2: clad
3: optical waveguide layer
4: substrate removal portion
5: optical waveguide removal portion
7: substrate
8a, 8a', 8b, 8b': phase adjusting means
9a, 9a', 9b, 9b', 16a, 16b: thin film heater
11a, 11b: matching medium displacing means
12: slit
13: index matching medium
14: gas
21a: optical branch portion
21b: optical coupling portion
30: Mach-Zehnder interferometer circuit

DETAILED DESCRIPTION OF THE INVENTION

Explanation will be hereinbelow made of embodiments of the present invention with reference to the accompanying drawings in which like reference numerals are used to denote like parts to those in the conventional example in order to avoid duplication of explanation thereto or to simplify explanation thereto.

(Configuration of First Embodiment)

A planar optical waveguide circuit type variable attenuator in a first embodiment of the present invention, as shown in FIG. 1(a), is composed of a Mach-Zehnder interferometer circuit 30 formed of cores 1, phase adjusting means 8a, 8b, and an optical shutter part 50.

Figure 10A:
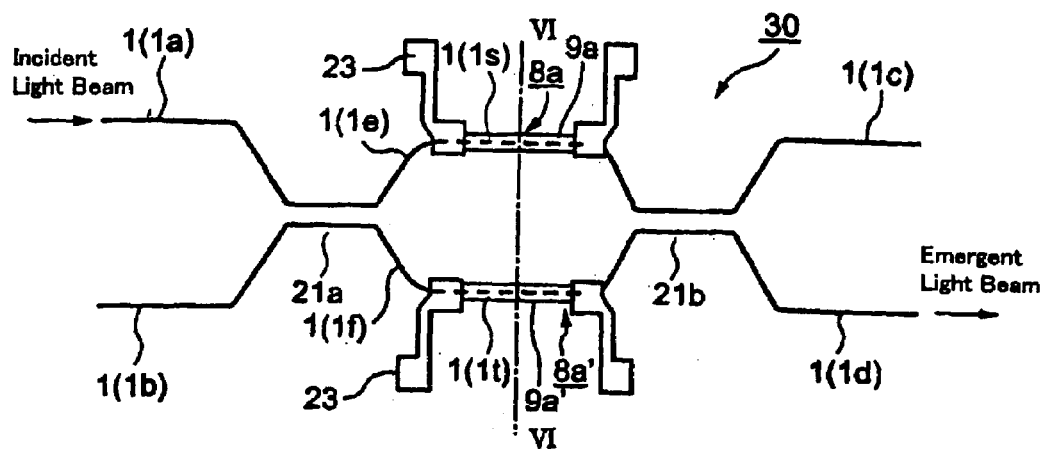
FIGS. 10(a) is a view illustrating an essential part of a conventional planar optical waveguide circuit type variable attenuator.
Figure 10B:
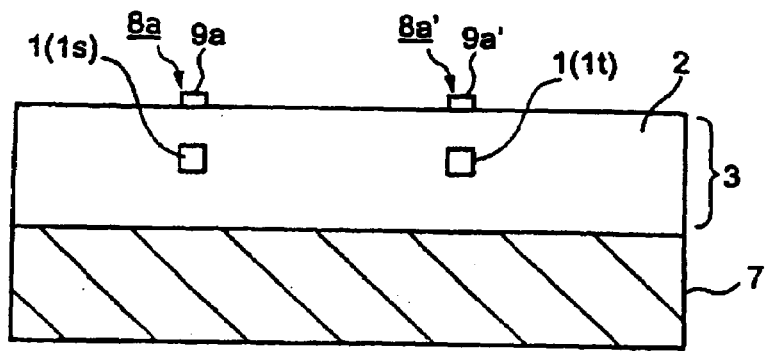
FIG. 10(b) is a sectional view along line VI—VI in FIG. 10 (a)
Figure 11:
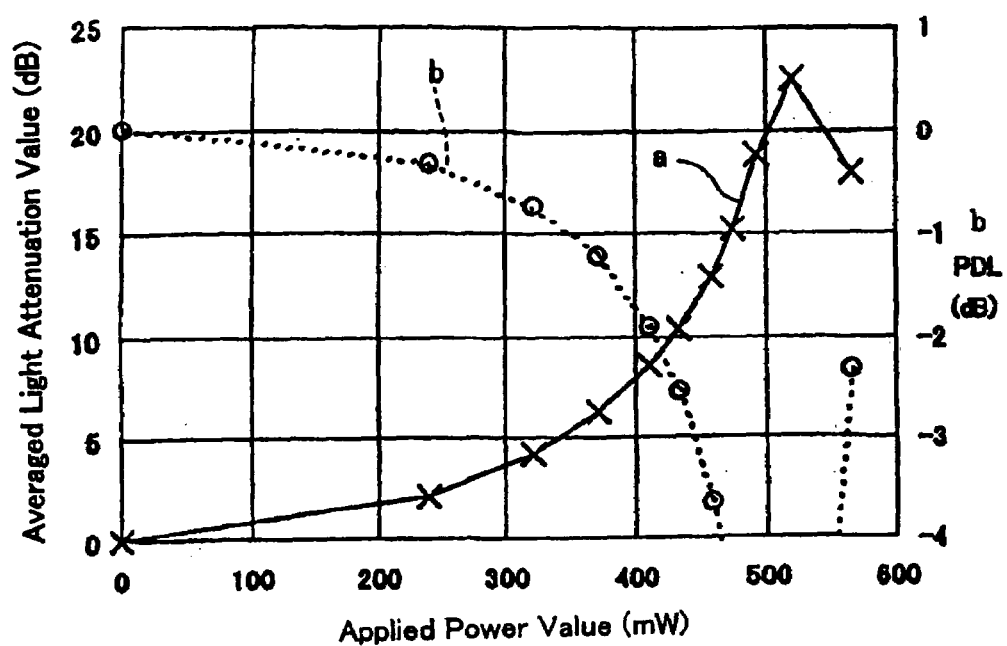
FIG. 11 is a graph showing a relationship between a power applied to a phase shifter in the conventional planar optical waveguide circuit type variable attenuator, and insertion loss and PDL shown in FIG. 10.

In this embodiment, the Mach-Zehnder interferometer circuit 30 is the same as that of the conventional Mach-Zehnder interferometer circuit 30 shown in FIG. 10(a), except that an output optical waveguide 1d is longer than an output optical waveguide 1c by, for example, 2 mm in the Mach-Zehnder interferometer circuit 30. Further, the slit 12 is formed in a longitudinally intermediate part of the output optical waveguide 1d, crossing the output optical waveguide 1d, and accordingly, there is provided an optical shutter 50 which is composed of the slit 12, an index matching medium 13 provided in the slit 12, and matching medium displacing means 11a, 11b for displacing the index matching medium 13 between a position including an optical path of a light beam transmitted through the output optical waveguide 11d and a position retracted from the optical path of the transmitted light beam.

The index matching medium 13 is provided in the slit 12 in a part of the latter, and is made of a liquid silicone group oil having a refractive index approximated (nearly equal, in this case) to that of the cores 1. Inert gas 14 such as nitrogen gas is enclosed in the slit 12 together with the index matching medium 13. Further, the matching medium displacing means 11a, 11b are formed of thin film heaters 16a, 16b that are formed in a U-like shape surrounding the slit 12.

It is noted that there are shown in FIG. 1(a), a light input parts 26, 27, and light output parts 28, 29. In this embodiment, the Mach-Zehnder interferometer circuit 30 have the optical branch portion 21a and the optical coupling portion 21b which are formed so as to have lengths equal to each other and have coupling efficiency rates η both set to 50% of light having a wavelength of 0.5 μm.

Further, the connection optical waveguides 1e, 1f have lengths which are equal to each other, having straight parts with a 5 mm length in the longitudinal direction thereof, being in parallel with each other, and being spaced from each other by a distance of 250 μm. The straight parts of the connection optical waveguides 1e, 1f are formed respectively therein with the phase adjusting means 8a, 8a' formed of the thin film heaters 9a, 9a', similar to the conventional example shown in FIG. 10(a).

Referring to FIG. 1(a) and FIG. 1(b) which is a sectional view along line I—I in FIG. 1(a), the optical waveguide layer 3 is formed therein, on opposite sides interposing the part where the phase adjusting means 8a, 8b are formed, with optical waveguide removal portions 5 in zones spaced from the connection optical waveguides 1e, 1f along the longitudinal direction of the connection optical waveguides 1e, 1f, which are removed thicknesswise from the front surface of the optical waveguide layer 3 toward the front surface of the substrate 7. The optical waveguide removal portions 5 are formed by removing the optical waveguide layer 3 up to the front surface of the substrate 7, being spaced from and in parallel with the phase part connection optical waveguides 1s, 1t.

The optical waveguide removal portions 5 are adapted to relieve a stress applied to the connection optical waveguides 1e, 1f when phase adjustment are carried out by the phase adjusting means 8a, 8a', and accordingly, the connection optical waveguides 1e, 1f are made into contact with such free spaces for relieving a stress, through a space therebetween.

In general, the phase shifter utilizing a thermal optical effect may sufficiently relive a stress caused by a thermal expansion of the optical waveguide layer in a direction perpendicular to the substrate, but may not sufficiently relive a stress caused by thermal expansion of the optical waveguide layer in a direction horizontal to the substrate, an anisotropic internal stress is further caused, which further increase the birefringence rate of the optical waveguide layer. Thus, phase variation values of the two polarized beams, that is, a phase variation value is different in the phase shifter part between a TE polarized light beams and a TM polarized light beam which are present in the optical waveguides, and as a result, there would be caused a difference between optical attenuation values, that is, a PDL which is determined by a phase difference of light beams transmitted through the connection optical waveguides 1e, 1f.

Accordingly, in this embodiment, with the provision of the optical waveguide removal portions 5 for relieving the above-mentioned stress, the birefringence rate of the optical waveguide layer 3 in zones where the connection optical waveguides 1e, 1f are formed and around the zones is constrained from increasing.

Further, in this embodiment, the optical waveguide removing portions 5 also serve as heat insulating means for constraining a heat applied to the connection optical waveguides 1e, 1f by the thin film heaters 9a, 9a' serving as the heating means, from being propagated outside of zones around the phase adjusting means 8a, 8a'. With this configuration, heat from the thin film heaters 9a, 9a' constituting the phase adjusting means 8a, 8a' are efficiently propagated to the phase part connection optical waveguides 1a, 1t. It is noted that the thin film heaters 9a, 9a' are connected thereto with power feed wirings (which are not shown), similar to power feed wirings 23 shown in, for example, FIG. 10(a).

Referring to FIG. 1(a), the above-mentioned slit 12 has a lengthwise side that crosses the optical axis of the output optical waveguide 1d with an intersection angle of 45 deg., having a width of 30 μm and a length of 250 μm. It is noted that FIG. 1(a) shows the output optical waveguide 1d having a zone 1y which is formed on the side where the transmitted light beam is inputted into the slit 12 and a zone 1z formed on the side where the transmitted light is outputted from the slit 12. Referring to FIG. 1(c) which is a sectional view along line II—II in FIG. 1(a), the slit 12 is formed from the front surface of the optical waveguide layer 3 to the front surface of the substrate 7 with a depth of 40 μm.

Further, the slit 12 is sealed by a cover 15 formed of a borosilicate glass plate, and the cover 15 is bonded to the upper clad layer 2 by means of an adhesive (which is not shown). As shown in FIG. 1(a), the thin film heater 16a, 16b constituting the matching medium displacing means 11a, 11b are formed on the upper clad layer 2 in the vicinity of the slit 12, being located around longitudinal opposite ends of the slit 12, in an U-like shape surrounding the slit 12. The slit 12 and the output optical waveguide 1d cross each other at an intersection part 24, nearer to the thin film heater 16a. The thin film heaters 16a, 16b are connected thereto with power feed wirings which are not shown.

Next, explanation will be made of a method of manufacturing the planar optical waveguide circuit type variable attenuator in this embodiment with reference to the drawings.

FIGS. 2 and 3 are explanatory views for explaining the method of manufacturing the planar optical waveguide circuit type variable attenuator in this embodiment, FIG. 2 showing states of respective manufacturing steps of the planar waveguide circuit type variable attenuator with sectional views along line I—I in FIG. 1(a) while FIG. 3 shows states of respective manufacturing steps of the planer optical waveguide circuit type variable attenuator with sectional views along line II—II in FIG. 1(a).

Figure 3A:
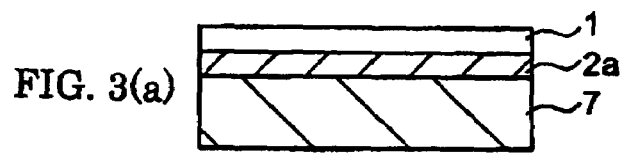
FIGS. 3(a) to 3(f) are sectional views along line II—II in FIG. 1(a), for explaining manufacturing steps of the planer optical waveguide circuit type variable attenuator in the first embodiment according to the present invention.

Referring to FIGS. 2(a) and 3(a), a lower clad layer 2a having a thickness of 20 μm and a layer having a thickness of 6 μm for the cores 1, are formed on the silicon substrate 7 with the used of a flame hydrolysis deposition process (FHD process). At this stage, the layer for the cores 1 is added thereto with $GeO_2$ so as to cause the layer for the cores 1 to have a refractive index which is higher than that of the lower clad layer 2a by 0.8%.

Figure 3B:
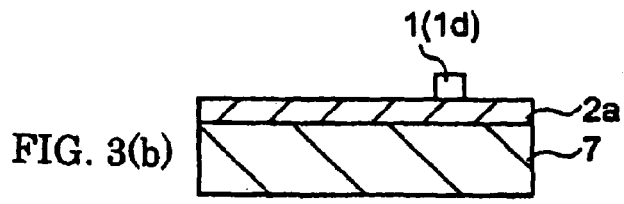

Next, referring to FIGS. 2(a) and 3(b), the optical waveguides in the cores 1 having a width of 6.5 μm is patterned by photolithography and dry-etching. The light waveguides in the cores 1 are formed as shown in FIG. 1(a).

Figure 2B:
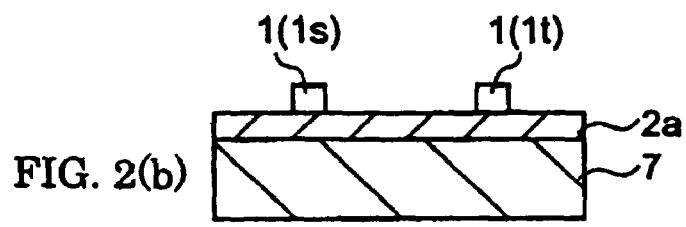

It is noted that since FIG. 2(b) is a sectional view along line I—I in FIG. 1(a), and accordingly, the cores 1 are shown with sections of the phase part connection optical waveguides 1s, 1t in the straight parts of the connection optical waveguides 1e, 1f, and since FIG. 3(b) is a sectional view along line II—II in FIG. 1(a), the cores 1 are shown with a section of the output optical waveguide 1d in a part corresponding to the intersection part 24.

Figure 2C:
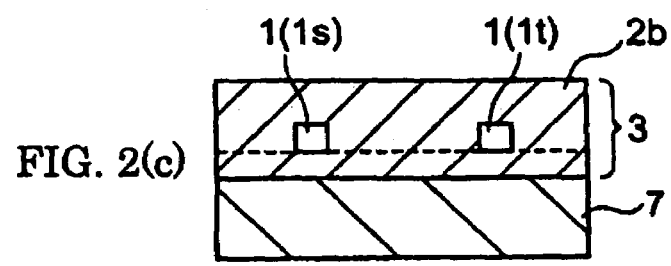
Figure 3C:
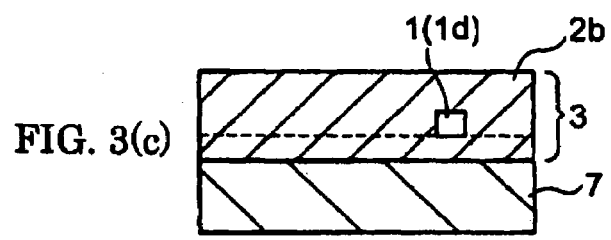

Next, referring to FIGS. 2(c) and 3(c), an upper clad layer 2b having a thickness of 20 μm is formed by using the FHD process, and the optical waveguides of cores 1 are embedded in the clad 2 so as to form the optical waveguide layer 3.

Figure 2D:
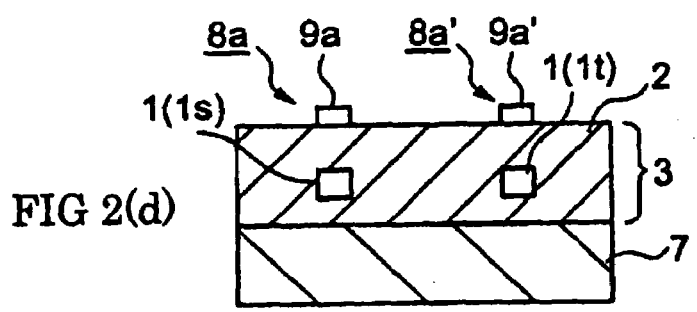
Figure 3D:
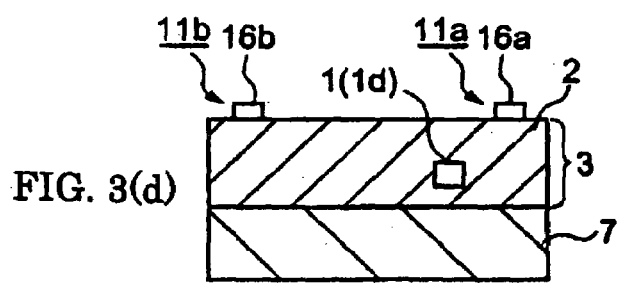

Next, referring to FIGS. 2(d), 3(d) and 1(a), with the use of a sputter process and a lift-off process, the thin film heaters 9a, 9a', 16a, 16b made of Ta are formed on the upper surface of the optical waveguide layer 3 in the parts corresponding to the respective straight parts (phase part connection optical waveguides 1s, 1t) of the connection optical waveguides 1e and 1f and the parts corresponding to the U-like shape surrounding the longitudinal opposite ends of the slit 12.

The thin film heaters 9a, 9a' are formed having a length of 5 mm, a width of 10 μm and a thickness of 1.0 μm, and the thin film heaters 16a, 16b are formed having a length of 140 μm in the lengthwise direction of the slit 12, a length of 110 μm in a widthwise direction thereof, a width of 20 μm, and a thickness of 1.0 μm.

Next, with the use of a method similar to the method of manufacturing the above-mentioned thin film heaters 9a, 9a', 16a, 16b, power feed wirings (which are not shown) composed of three layers Ti/Ni/Au are formed. Then, an insulation film (which is not shown) made of $SiO_2$, for protecting and insulting the thin film heaters and the power feed wirings is formed on the overall surface of the substrate by the sputter process.

Figure 2E:
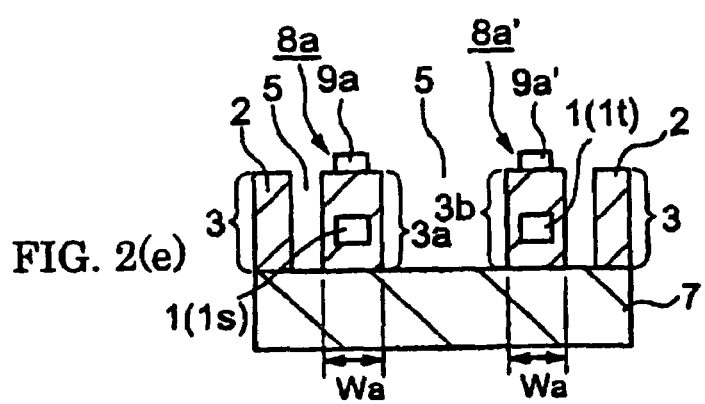

Next, referring to FIGS. 2(e), 1(a) and 1(b), the optical waveguide removal portions 5 are formed in the optical waveguide layer 3 on opposite sides interposing therebetween the part where the thin film heaters 9a, 9a' serving as the phase adjusting means 8a, 8a' are formed. These optical waveguide removal portions 5 are formed by removing zones which are in parallel with and are spaced from each other, along the longitudinal directions of the straight parts of the connection optical waveguides 1e, 1f, from the front surface of the optical waveguide layer 3 to the front surface of the substrate 7 with the use of dry etching. The dimensions of the optical waveguide removal portions are, for example, a length of 5 mm and a width of 100 μm.

Figure 3E:
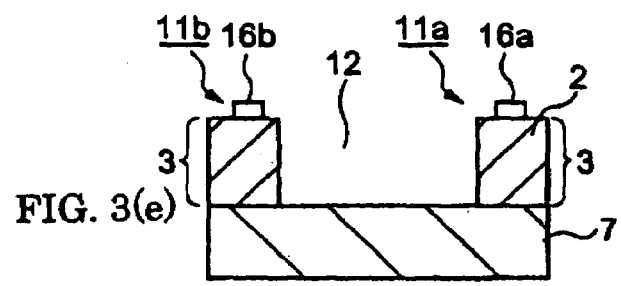

With the formation of the optical waveguide removal portions 5, the width Wa of the optical waveguide layer 3 (3a, 3b) including the straight parts of the connection optical waveguides 1e, 1f becomes 20 μm. Further, simultaneously, as shown in FIGS. 3(e), 1(a) and 1(c), the optical waveguide layer is similarly removed in a zone corresponding to the slit 12 which is therefore formed. The slit 12 has a width of 30 μm and a length of 250 μm, crossing the output optical waveguide 1d at a position having a distance of 50 μm from one end of the slit 12 on the side near to the thin film heater 16a so as to define the intersection part 24.

Figure 3F:
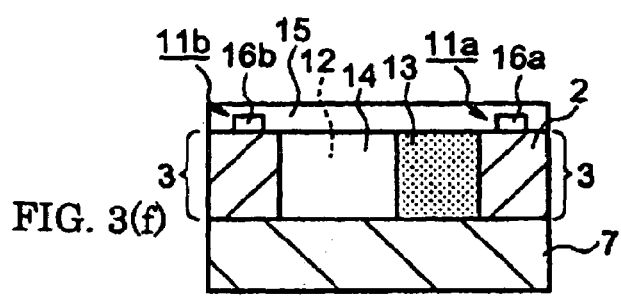

Next, referring to FIGS. 3(f), 1(a) and 1(c), the slit 12 is charged therein with the index matching medium 13 by such a quantity that, for example, about a half of the slit 12 on the third thin film heater 16a side is filled therewith in order to allow the intersection part 24 to be filled with the index matching medium 13. Thereafter, the cover 15 is joined to the slit 12 by an adhesive in the atmosphere of nitrogen gas serving as the gas 14 so as to be sealed. Thus, the optical shutter portion 50 is formed.

Next, explanation will be made of the operating method of the optical variable attenuator in the first embodiment. At first, a signal light beam is applied from the light input part 26 of the input optical waveguide 1a, and the signal light beam then branches in the branch portion 21a so as to be transmitted through the connection optical waveguides 1e, 1f, thereafter being coupled in the optical coupling portion 21b so as to be transmitted through the output optical waveguide 1d. Thus, the transmitted light beam passes through the slit 12 provided in the intermediate part of the output optical waveguide 1d so as to be transmitted to the light output end 29 side.

At this time, as shown in FIG. 1(a), in such a case that the index matching medium 13 in the slit 12 is located at the position including the optical path of the transmitted light beam in the output optical waveguide 1d, since the intersection part 24 is filled with the index matching medium 13 having a refractive index substantially equal to the cores 1, a loss of the signal light beam passing through the intersection part 24 is extremely small, that is, for example, about 0.2 dB. That is, in the output optical waveguide 1d, the signal light beam which is incident upon the intersection part 24 of the slit 12 from the zone 1y side thereof is transmitted to the zone 1z side with substantially no reflection upon the slit wall surfaces. The refractive index of the index matching medium 13 becomes higher than that of, for example, the upper clad layer 2.

Thus, in this case, substantially no attenuation value is present on the optical shutter portion 50 side, thereby it is possible obtain an optional light attenuation value in a range from 0 to 10 dB through phase adjustment by the phase adjusting means 8a, 8a' formed in the Mach-Zehnder interferometer circuit 30. That is, by energizing, for example, the thin film heater 9a so as to generate a heat, the effective optical waveguide length of the phase part connection optical waveguide 1s is changed by the thermooptical effect caused by the generated heat so as to change the phase of the light beam transmitted through the phase part connection optical waveguide 1s, and accordingly, the light transmittance of the Mach-Zehnder interferometer circuit 30 is changed, thereby it is possible to obtain an optional light attenuation value in the range from 0 to 10 dB, similar to the conventional optical variable attenuator.

It is noted that the thin film heaters 16a, 16b for the optical shutter portion 50 are not energized in the condition shown in FIGS. 1(a) and 1(b), but the index matching medium 13 in the slit 12 is held in the intersection part 24. This is because of such a phenomenon that a liquid is held at one end of the slit 12 due to surface tension in such a condition that the liquid is enclosed in the narrow slit 12 together with a gas.

Meanwhile, by energizing the thin film heater 16a so as to generate heat, the surface tension of the index matching medium 13 is decreased on the thin film heater 16a side, and accordingly, a grade is caused in the surface tension of the index matching medium 13 in the slit 12, along the longitudinal direction of the slit 12. Due to such a phenomenon that the liquid in the narrow slit 12 is displaced in the direction in which the surface tension is higher while the gas 14 is displaced in the direction in which the surface tension is lower, when the above-mentioned grade in the surface tension is caused, the liquid index matching medium 13 is displaced to the thin film heater 16b side which is not heated, that is, it is displaced to the position retracted from the optical path of the transmitted light beam in the output optical waveguide 1d. Thus, the intersection part 24 is filled with the gas 14.

Figure 4A:
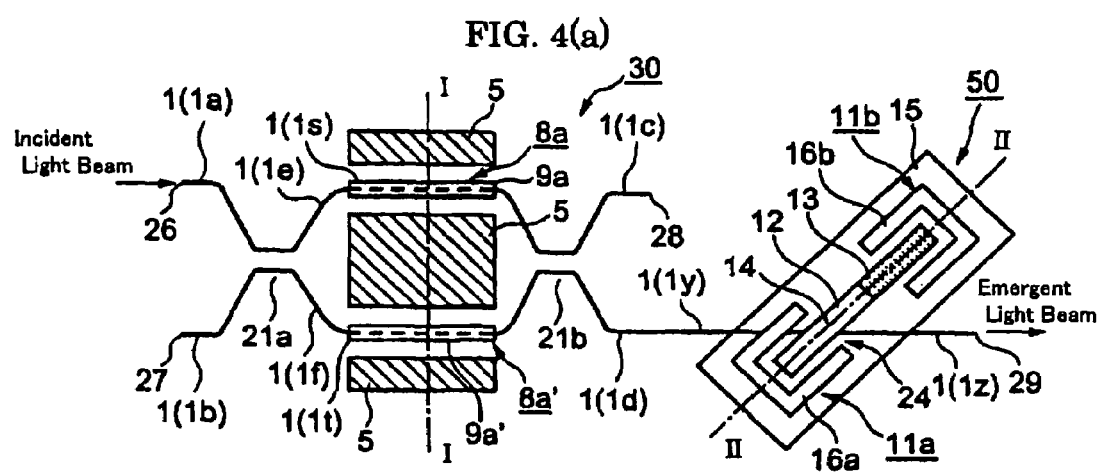
FIG. 4(a) is a plan view illustrating an operating condition in which the planar optical waveguide circuit type variable attenuator in the first embodiment according to the present invention falls in a state different from that shown in FIG. 1.

Further, as stated above, after the index matching medium 13 is completely displaced to the thin film heater 16b side, when the power supply to the thin film heater 16b is interrupted, no grade induced in the surface tension is present. However, as stated above, the index matching medium 13 in the slit 12 is held at one end of the slit 12 on the thin film heater 16b side by capillarity. FIG. 4(a) which is a plan view and FIG. 4(b) which is a sectional view show the condition at this time. It is noted that FIG. 4(b) is a sectional view along line II—II in FIG. 4(a), illustrating the optical shutter portion 50.

Figure 4B:
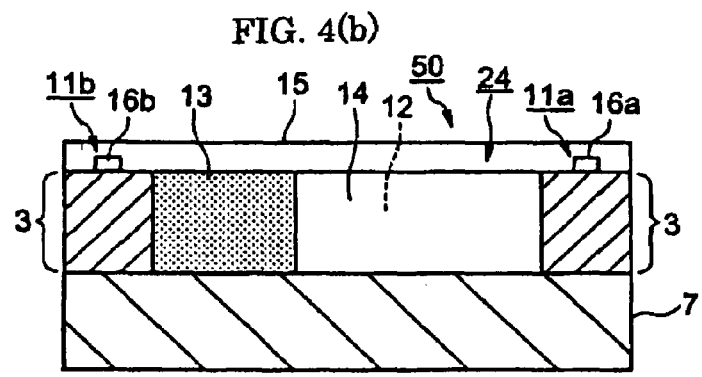
FIG. 4(b) is a sectional view along line II—II in FIG. 4(a)

In the condition shown in FIGS. 4(a) and 4(b), that is, in such a condition that the intersection part 24 is filled with the gas 14, the signal line which is incident upon the intersection part 24 of the slit 12 from the zone 1y side of the output optical waveguide 1d is totally reflected by the wall surfaces of the slit, and is then radiated onto the clad 2 without being transmitted substantially to the zone 1z side. In this case, the loss of the signal light transmitted from the zone 1y side of the output optical waveguide 1d to the zone 1z through the intersection part 24 is not less than about 35 dB which is relative large.

Thus, the optical variable attenuator in the first embodiment may offer a relative large optical attenuation value of 35 dB with completely no power supply, that is, without energizing the phase adjusting means 8a, 8a' in the Mach-Zehnder interferometer circuit 30 and without feeding a power to the thin film heaters 16a, 16b in the optical shutter portion 50.

Further, by energizing the phase adjusting means 8a, 8a' in the Mach-Zehnder interferometer circuit 30 so as to set the optical attenuation value in the Mach-Zehnder interferometer circuit 30 to, for example, 20 dB, a large light attenuation value of not less than about 55 dB may be obtained as a light attenuation value in the optical variable attenuator.

Explanation will be hereinbelow made of results of measurement for light attenuation characteristics with the use of an optical variable attenuator which was actually manufactured. During the measurement, a light beam from a laser diode having a wavelength of 1.55 μm was incident upon the light input part 26 of the input optical waveguide 1a and was then emerged from the light output part 29 of the output light waveguide 1d. Then, the insertion loss of the light beam was measured. The measurements were made with the use of TE-polarized light and TM-polarized light, respectively and independently.

At first, in the condition shown in FIG. 1, that is, in such a condition that the intersection part 24 is filled with the index matching medium 13, an insertion loss was measured in a no power supply state, the insertion loss of the TE-polarization was 1.21 dB while the insertion loss of the TM polarization was 1.22 dB. These values were higher than that in the conventional variable attenuator by about 0.2 dB, and it was found that the loss was increased by the slit 12.

Next, a power is fed to only the phase adjusting means 8a so as to change the value of power supply in a range from 0 to 80 mW. The relationship between the power supply value and the insertion loss at this time is exhibited by a characteristic curve a shown in FIG. 5. Further, the relationship between the power supply value and the difference (PDL) in insertion loss between the TE polarized light and the TM polarized light is exhibited by a characteristic curve b shown in FIG. 5.

Figure 5:
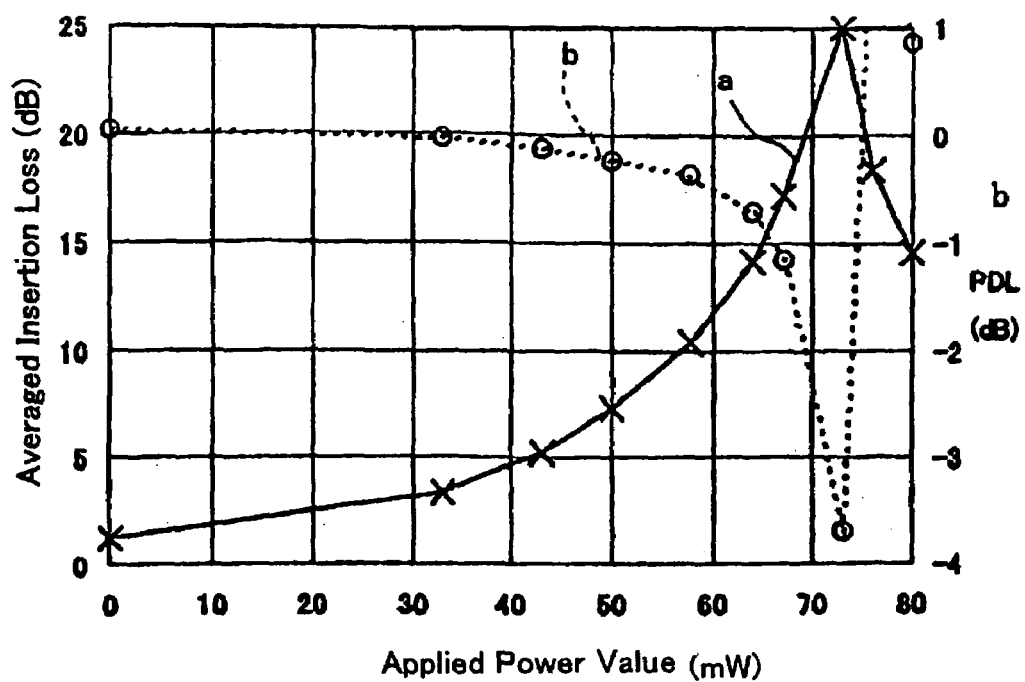
FIG. 5 is a graph showing a relationship between an insertion loss and a PDL, and a power applied to a first phase shifter in the planer optical guide wave type variable attenuator in the first embodiment according to the present invention, in the operating condition shown in FIG. 1.

As indicated by the characteristic curve a in FIG. 5, the insertion loss is increased as the power supply value is increased, that is, a maximum insertion loss of 25.0 dB is obtained at about 72 mW. At this time, it has been found that a light attenuation value which is equal to a difference from an insertion loss in such an initial condition that the power supply value is 0 mW becomes 23.8 dB at maximum. Further, there is obtained such a satisfactory PDL characteristic that the PDL is not greater than about 0.5 dB as exhibited by the characteristic curve b in FIG. 5, in a range from a light attenuation value in the initial condition to about 10 dB, that is, in a range up to about 58 mW of a power supply value with which an insertion loss of about 11.2 dB is obtained.

Next, the power supply to the phase adjusting means 8a was interrupted while the thin film heater 16a was energized for heating, and the index matching medium 13 was displaced to the thin film heater 16b side, as shown in FIGS. 4(a) and 4(b) so as to fill the intersection part 24 with the gas 14. Thereafter, the thin film heater 16a was deenergized.

Even after the deenergization of the thin film heater 16a so as to effect a completely no power supply state, the index matching medium 13 was held at the slit end on the fourth thin film heater 16b side due to capillarity. Further, the insertion loss at this time was measured so as to obtain 41.5 dB. It has been found that the light attenuation value which is a difference from the insertion loss in the initial condition becomes high, that is, it is not less than 40 dB.

Further, keeping such a condition that the intersection part 24 was filled with the gas 14, a power of about 72 mW was fed to only the phase adjusting means 8a in order to measure the insertion loss. Thus, 65.3 dB was obtained. It has been found that a light attenuation value which is a difference from the insertion loss in the initial condition becomes high, that is, about not less than 60 dB.

With the configuration of the first embodiment, as stated above, by appropriately functioning the Mach-Zehnder interferometer circuit 30 in which the optical waveguide layer removal portions 5 are formed in the vicinity of the connection optical waveguides 1e, 1f, the phase adjusting means 8a, 8a' formed in the connection optical waveguides 1e, 1f and the optical shutter portion 50, there may be materialized such an optical variable attenuator in which an optional light attenuation value may be accurately obtained in such a condition that a difference in insertion loss between TE-polarized light and TM-polarized light is small, within a light attenuation range from about 0 to 10 dB, and further, and in which a large light attenuation value, that is, not less than 60 dB with power supply and not less than 40 dB with no power supply, may be obtained.

(Second Embodiment)

Figure 6:
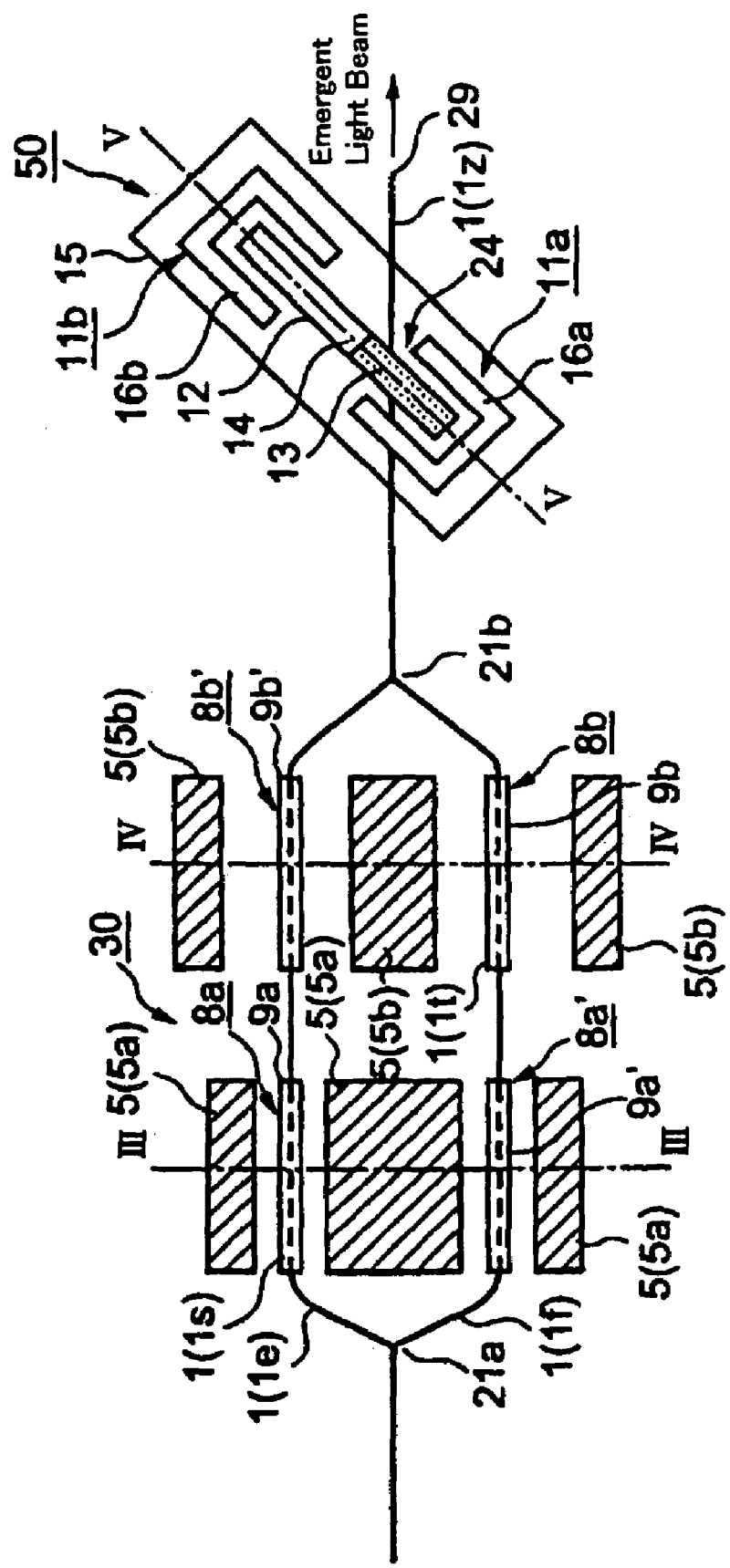
FIG. 6 is a schematic plan view illustrating a second embodiment of the planar optical waveguide circuit type variable attenuator according to the present invention.
Figure 7A:
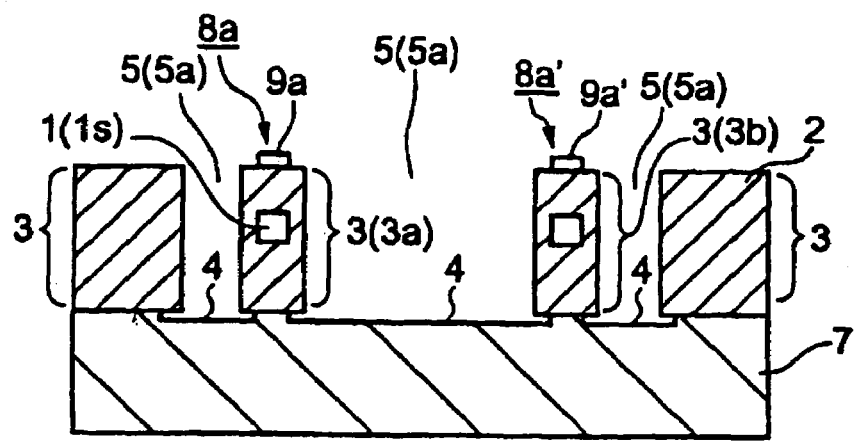
FIG. 7(a) is a sectional view along line III—III in FIG. 6.
Figure 7B:
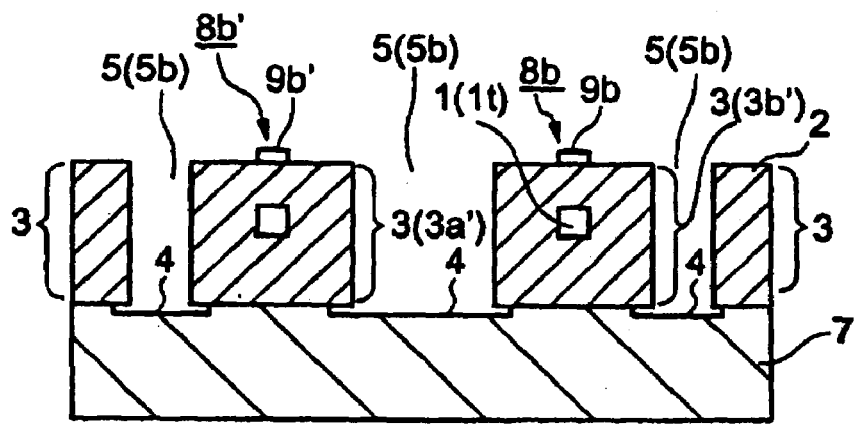
FIG. 7(b) is a sectional view along line IV—IV in FIG. 6.
Figure 7C:
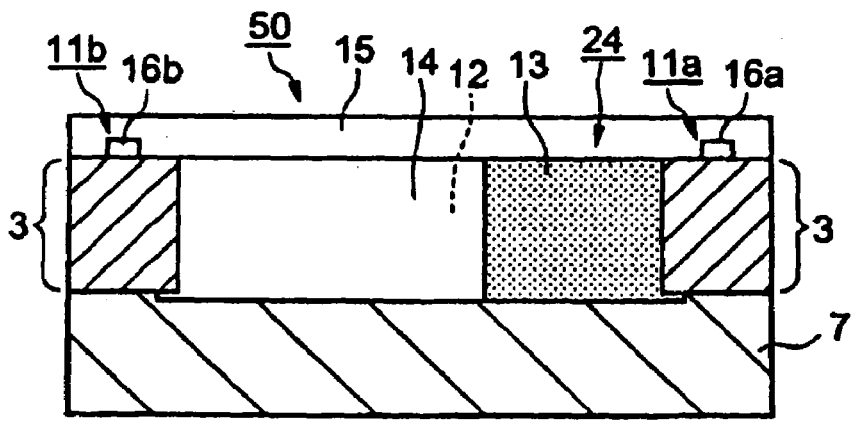
FIG. 7(c) is a sectional view along line V—V in FIG. 6.

Next, explanation will be made a second embodiment of the planar optical waveguide circuit type variable attenuator according to the present invention. The second embodiment has a planar configuration as shown in FIG. 6. Further, FIG. 7(a) is a sectional view along line III—III in FIG. 6 while FIG. 7(b) is a sectional view along line IV—IV in FIG. 6, and FIG. 7(c) is a sectional view along line V—V in FIG. 6.

Referring to FIG. 6, in the second embodiment, each of an optical branch portion 21a and an optical coupling portion 21b is formed of a Y-branch having a branch ratio of 1:1. It is noted that a Y-branch having a branch ratio of 1:1 has such a characteristic that wave-dependency of the branch ratio is low in comparison with the 2×2 directional coupler.

Further, in the second embodiment, one of the connection optical waveguides 1e, 1f which are arranged in parallel with each other constitutes a first connection optical waveguide 1e while the other one them constitutes a second connection optical waveguide 1f. The first and second connection optical waveguides 1e, 1f are formed therein with the phase adjusting means 8a, 8b', 8a', 8b, two for each, being longitudinally spaced from each other. The first phase adjusting means 8a is formed in the first connection optical guide wave 1e, near to the input side, while the forth phase adjusting means 8b' are formed therein, near to the output side. The third phase adjusting means 8a' is formed in the second connection optical waveguide 1f, near to the input side, and the second phase adjusting means 8b is formed therein, near to the output side.

The first phase adjusting means 8a, the third phase adjusting means 8a', the second phase adjusting means 8b and the fourth phase adjusting means 8b' all have the one and the same condition, and these phase adjusting means 8a, 8a', 8*b*, 8*b*' are constituted, similar to the phase adjusting means 8*a*, 8*a*' in the first embodiment, that is, they have thin film heaters 9*a*, 9*b*', 9*a*', 9*b*.

The distance between the first phase adjusting means 8*a* and the optical waveguide removal portion 5 (5*a*) widthwise adjacent to the fist phase adjusting means 8*a*, and the distance between the third phase adjusting means 8*a*' and the optical waveguide removal portion 5 (5*a*) widthwise adjacent to the third phase adjusting means 8*a*' are equal to each other, that is, a first set distance D1. Namely, the widths of the optical waveguide layers 3*a*, 3*b* shown in FIG. 7(*a*) are equal to each other.

Further, the distance between the second phase adjusting means 8*b* and the optical waveguide removal portion 5 (5*b*) widthwise adjacent to the second phase adjusting means 8*b*, and the distance between the fourth phase adjusting means 8*b*' and the optical waveguide removal portion 5 (5*b*) widthwise adjacent to the fourth optical waveguide removal portion 5 (5*b*) are equal to each other, that is, a second set distance D2 which is different from the first distance D1. Namely, the widths of the optical waveguide layers 3*a*', 3*b*' shown in FIG. 7(*b*) are equal to each other, but are different from the widths of the optical waveguides 3*a*, 3*b* shown in FIG. 7(*c*).

Thus, since the widths of the optical waveguide layers 3*a*, 3*b* are different from each other, the relieving values for stress applied to the connection optical waveguides 1*e*, 1*f* are different from each other when the phase adjustment is carried out by the phase adjusting means 8*a*, 8*b*. Accordingly, birefringence rates of the connection optical waveguides 1*e*, 1*f* caused by the stress are different from each other, and further, the variation rates of difference in the polarization of the phase (difference between the phase of TE-polarized light and the phase of TM-polarized light) of the transmitted light beam which are determined by the birefringence rates, are different from each other.

Further, as shown in FIGS. 7(*a*) an 7(*b*), in the second embodiment, substrate removal portions 4 are formed in the front surface of the substrate 7 at positions facing the lower parts of the optical waveguide removal portions 5, by removing a part of the upper layer of the substrate 7. The substrate removal portions 4 are recesses having a rectangular sectional shape such that the lower parts of the optical waveguide removal portions 5 are cut in a direction in which their widths become wider than the space defined between the opposite surfaces of the optical waveguide removal portions 5. These recesses have a width of 70 μm which is larger than the 50 μm width of the lower part of the optical waveguide removal portion 5 by 20 μm, a depth of 10 μm and a length of 5 mm.

The substrate removal portion 4 is formed by, for example the steps of immersing the optical waveguide circuit type variable attenuator in an KOH solution after the formation of the optical waveguide removal portions 5 so as to effect etching of the silicon substrate 7 by utilizing anisotropic etching of KOH for the silicon substrate. The substrate removal portions 4 are also formed in the slit 12 side as shown in FIG. 7(*c*).

Further, in this second embodiment, the index matching medium 13 is charged in the slit 12 in a part of the latter while the gas 14 which is argon gas is enclosed therein, and the cover 15 is bonded (joined) with the use of the lower melting point glass for glass sealing. With the application of argon gas and the application of the glass sealing to the cover 15, the index matching medium 13 is reliably displaced by heating of the thin film heaters 16*a*, 16*b*, thereby it is possible to further enhance the reliability of the shutter portion 50.

Except the configuration stated above, the configuration of the second embodiment is the same as that of the first embodiment, and further, the method of manufacturing thereof is also the same as that of the first embodiment.

As stated above, with the phase shifter utilizing the thermooptical effect, in general, stress caused by thermal expansion of the optical waveguide layer may be sufficiently relieved in a direction perpendicular to the substrate, but stress caused by thermal explanation of the optical waveguide layer may be not sufficiently relieved in a direction horizontal to the substrate, and accordingly, anisotropic internal stress is additionally induced. Thus, the birefringence rate is further increased by this anisotropic internal stress, resulting in occurrence of a difference or PDL in light attenuation caused by a difference in phase difference of TE polarized light and TM polarized light between the light beam transmitted through the first connection optical waveguide 1*e* and the light beam transmitted through the second connection optical waveguide 1*f*.

In the second embodiment, the distance between the first phase adjusting means 8*a* and the optical waveguide removal portion 5 (5*a*) adjacent the first adjusting means 8*a* is set to the first set distance D1 while the distance between the second phase adjusting means 8*b* and the optical waveguide removal portion 5 (5*b*) adjacent the second phase adjusting means 8*b* is set to the second setting distance D2 which is different from the first set distance D1. Thereby it is possible to exhibit the following technical effects and advantages:

That is, in the second embodiment, the anisotropy of stress in the part of the connection optical waveguide 1*e* in which the first phase adjusting means 8*a* is formed and the anisotropy of stress in the part of the connection optical waveguide 1*f* in which the second phase adjusting means 8*b* is formed may be different from each other, and variation rates of the birefringence with respect to phase adjusting values may be different from each other between the first connection optical waveguide 1*e* in the part where the first phase adjusting means 8*a* is formed and the second connection output waveguide 1*f* in the part where the second phase adjusting means 8*b* is formed.

Thus, in the second embodiment, the first phase adjusting means 8*a* (first phase shifter) and the second phase adjusting means 8*b* (second phase shifter) are simultaneously energized while the power is controlled so that the birefringence rates of the first connection optical waveguide 1*e* in the part where the first phase adjusting means 8*a* is formed is set to be equal to the birefringence of the second connection optical waveguide 1*f* in the part where the second phase adjusting means 8*b* is formed, thereby it is possible to set the phase differences of the light beams transmitted through the first connection optical waveguide 1*e* and the second connection optical waveguide 1*f* to be equal to each other between the TE-polarized light and the TM-polarized light. That is, the PDL may be theoretically set to zero.

It is noted that the effect of reduction of the PDL with the above-mentioned configuration is detailed in Japanese Patent Application No. 2003-111370.

With the planar optical waveguide circuit type variable attenuator in this second embodiment, the insertion loss was measured with no power supply in a condition in which the intersection part 24 is filled with the index matching medium 13. The insertion loss of TE polarization was 1.3 dB while that of TM polarization was 1.32 dB.

Next, in a condition in which the intersection part 24 was filled with the index matching medium 13, power was fed to the first phase shifter and the second phase shifter (the power is applied to the first phase adjusting means 8a and the second phase adjusting means 8b) so as to set the light attenuation value to 5, 10, 15 and 20 dB. At this time, the relationship between a set light attenuation value, and an insertion loss and a PDL which were measured was obtained. The results are exhibited in Table 1.

TABLE 1

| Set Light Attenuation Value (dB) | Power to First Phase Shifter (mW) | Power to Second Phase Shifter (mW) | Insertion Loss of TE polarization (dB) | Insertion Loss of TM Polarization (dB) | PDL (dB) |
|---|---|---|---|---|---|
| 5.0 | 35.9 | 20.00 | 6.31 | 6.26 | 0.05 |
| 10.0 | 60.00 | 33.40 | 11.32 | 11.27 | 0.05 |
| 15.0 | 72.50 | 40.30 | 16.28 | 16.36 | −0.08 |
| 20.0 | 79.30 | 44.10 | 21.24 | 21.35 | −0.11 |

As clearly understood from Table 1, the PDL is constrained to a small value of not greater than +/−0.11 dB in a light attenuation range up to about 20 dB.

Next, when the power supply to the first and second phase adjusting means 8a, 8b were interrupted and the thin film heater 16a was energized for heating, the index matching medium 13 was displaced to the thin film heater 16b side so as to fill the intersection part 24 with the gas 14, and thereafter, the thin film heater 16a was deenergized. It is noted that similar to the first embodiment, even after no power is supplied due to deenergization of the thin film heater 16a, the index matching medium 13 was held at one end of the slit 12 on the thin film heater 16a side.

At this time, the insertion loss was measured, which was 37.7 dB. That is, it is understood that the light attenuation value which is a difference from the insertion loss in the initial condition is high, that is, not less than 36 dB at this time.

Further, keeping the intersection part 24 filled with the gas 14, the power of 79.30 mW and 44.10 mW were applied to the first and second phase adjusting means 8 (8a, 8b) in order to measure the insertion loss, and the resulting value was 57.7 dB. Namely, the light attenuation value, which is the difference from insertion loss in the initial state, was very high value, being not less than about 56 dB. Further, at this time, the PDL was as low as 0.5 dB.

As stated above, according to the second embodiment, there is provided an optical variable attenuator in which an optional light attenuation value may be precisely obtained with a low PDL in a range from 0 to about 20 dB, and further, a large light attenuation value which is not less than 56 dB in a power supply condition but not less than 36 dB in a no power supply condition may be obtained.

(Third Embodiment)

Figure 8:
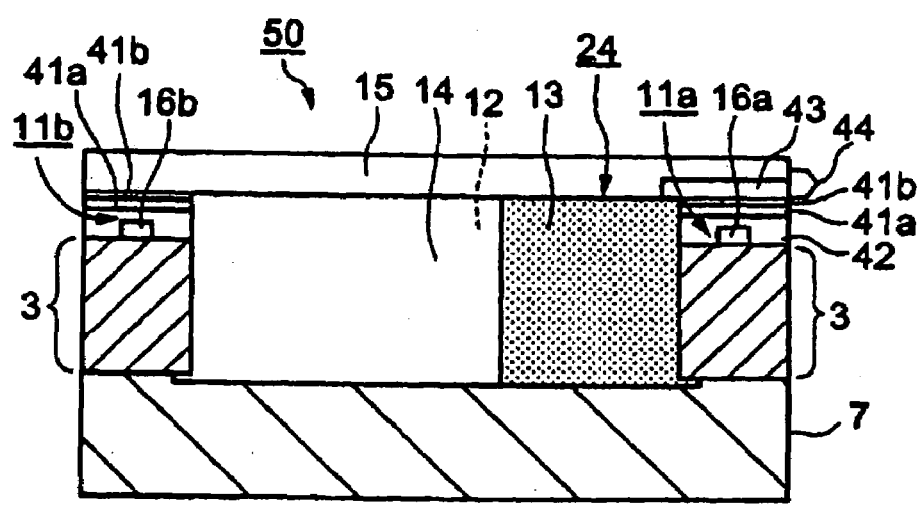
FIG. 8 is a sectional view illustrating an index matching medium in an optical shutter in a third embodiment of the planar optical waveguide circuit type variable attenuator according to the present invention, in an another condition.

Next, explanation will be made of a third embodiment of the planar optical waveguide circuit type variable attenuator according to the present invention. The configuration of the third embodiment is similar to that of the second embodiment, FIG. 8 being a sectional view illustrating the optical shutter portion 50 in the third embodiment. FIG. 8 is a sectional view along line V—V in FIG. 6. The third embodiment is different from the second embodiment in view of the following points: a first point is such that the lid 15 of the optical shutter portion 50 is joined by diffusion joint of thin copper films; and a second point is such that there is provided a liquid charge groove 43 connected to the slit 12, and accordingly, the index matching medium 13 is charged through the liquid charge groove 43 after the joint of the cover 15.

In the third embodiment, a metal thin film 41a made of copper is formed on a joint surface of the cover 15 over the insulation film 42 formed on the optical waveguide layer 3 and the thin film heater 16a, 16b, and diffusion joint is made between the metal thin film 41a and a metal thin film 41b made of copper, which is formed on the joint surface of the cover 15 in order to join the cover 15. Through the diffusion joint between the metal thin films, since the joint is effected by diffusion of metal atoms, firm joint may be made, and further, since the joint is firmly made through the solid phase, there are caused no problem of positional deviation or the like upon the joint, thereby it is possible to seal the cover 15 with a high degree of accuracy.

Further, with the use of copper for the metal thin films 41a, 41b, the diffusion joint may be made within a temperature range (for example, 250 to 600° C.) which does not affect characteristics of the optical waveguides, heaters, wiring and the like, and further, no recrystallization or the like occurs in a temperature range (for example, about 0 to 100° C.) in which joint portions are normally used, thereby it is possible to obtain a high degree of reliability over a long time.

FIG. 9 is sectional views for explaining manufacturing steps for the planer optical waveguide circuit type variable attenuator in the third embodiment, which correspond to a sectional view along line V—V in FIG. 6. Even in the third embodiment, as shown in FIGS. 9(a) to 9(d), the manufacturing steps up to the formation of thin film heaters 16a, 16b and the power feed wirings (which are not shown) are carried out, similar to those in the first and the second embodiments.

Figure 9A:
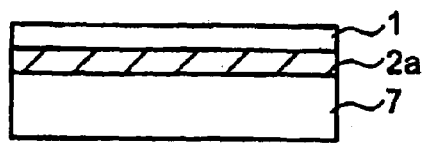
FIGS. 9(a) to 9(h) are sectional views for explaining manufacturing steps of the optical shutter in the planar optical waveguide circuit type variable attenuator in the third embodiment according to the present invention.
Figure 9B:
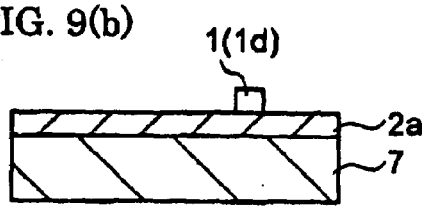
Figure 9C:
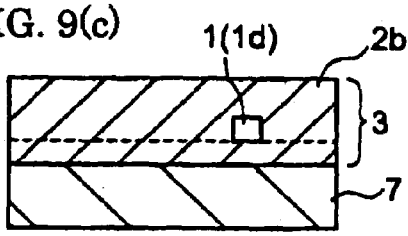
Figure 9D:
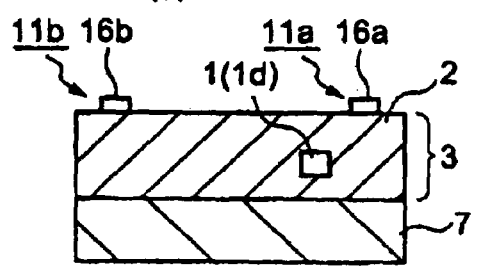
Figure 9E:
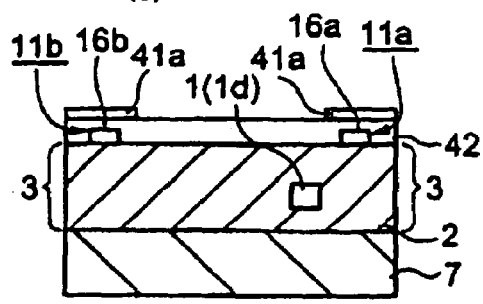

Next, as shown in FIG. 9(e), an insulation film 42 made of $SiO_2$ is formed with the use of a sputter process, the metal thin film 41a made of copper is formed on the joint surface for the cover 15 on the insulation film 42 with the use of a sputter process and a lift-off process, having a thickness of 3 μm. At this stage, in order to enhance the adherence between the metal thin film 41a and the insulation film 42, a chromium film (which is not shown) having a thickness of 0.1 μm is formed between the metal thin film 41a and the insulation film 42.

Figure 9F:
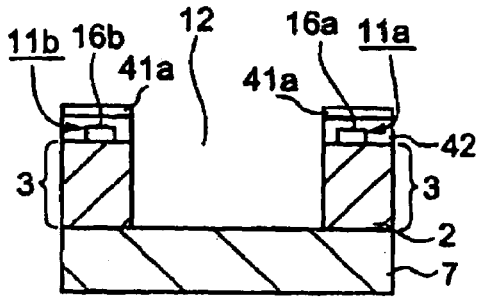
Figure 9G:
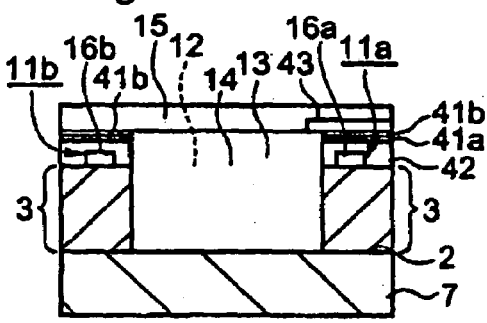

Next, as shown in FIG. 9(f), the optical waveguide layer 3 is removed in a zone corresponding to the slit 12 which is therefore formed. Next, as shown in FIG. 9(g), a metal thin film 41b similar to the metal thin film 41a formed on the insulation film 42 is formed, and the liquid charge groove 43 is formed in the cover 15. The slit 12 is covered with the cover 15, and then is held at a temperature of 500° C. for 2 hours in the atmosphere of inert gas or vacuum while the cover 15 is held under a pressure of about 10 kgf/mm in order to effect diffusion joint between the metal thin film 41a and the metal thin film 41b.

Figure 9H:
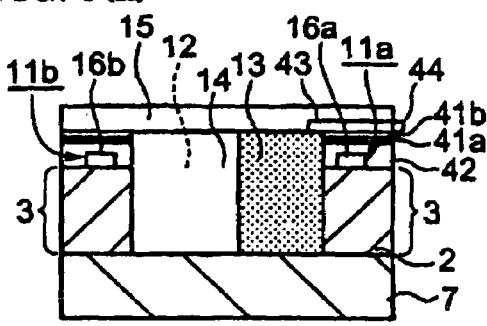

At this stage, concaves and concavities which are formed on the front surface of the insulation film 42 due to affection by the thin film heaters 16a, 16b, power feed wirings (which are not shown), the cores 1(1d) and the like are smoothened by deformation of the metal thin films during the diffusion joint, the parts where the metal thin films are formed are joined to each other in its entirety. Finally, in an atmosphere of argon, the index matching medium 13 is charged by such a quantity that about a half of the slit 12 is filled therewith, as shown in FIG. 9(h), through the liquid charge groove 43 which is thereafter sealed by an adhesive 44.

With the planar optical waveguide circuit type variable attenuator in the third embodiment, optical characteristics were measured. Similar to the embodiment 2, a light attenuation value of about 0 to 20 dB was accurately obtained with a low PDL of not greater than 0.2 dB, and further, a large light attenuation value of not less than 56 dB with power supply but not less than 36 dB with no power supply could be obtained.

As stated above, according to the third embodiment, there may be provide such a highly reliable variable attenuator that a light attenuation value of about 0 to 20 dB may be accurately obtained while a low PDL of not greater than 0.2 dB may be obtained, and further, a large light attenuation value which is not less 55 dB with power supply but is not less than 35 dB with no power supply may be obtained.

(Other Embodiments)

Without being limited to the above-mentioned embodiments, according to the present invention, there may be considered various embodiments. For example, although the quartz group optical waveguides are used in the above-mentioned embodiments, the planar optical waveguide circuit type variable attenuator may be formed from various materials including polymer and semiconductor, the material from which the optical waveguides are formed may be appropriately selected in view of a required optical loss value, reliability, costs and the like. Further, dimensions of the optical waveguides may be appropriately set.

Further, although the substrate 7 is a silicon substrate in the above-mentioned embodiments, the substrate 7 may be made of various substrate materials such glass materials including quartz glass and crystallized glass, silicon carbide, silicon nitrate, ceramics such as alumina and the like. The material may be selected in view of heat dissipation, stress applied to the optical waveguide layer 3 and the like.

In the above-mentioned embodiments, although the thin film heaters 9a, 9a', 16a, 16b are formed of a Ta film, the material from which the thin film heaters 9a, 9a', 16a, 16b are formed should not be limited to a specific material, but it may be appropriately selected, that is, various heater materials such as Ni, Cr, $TaN_x$ (X is from 0 to 1.0), Au, Pt, W, alloy thereof and the like may be used. That is, the material from which the heaters are formed may be appropriately selected in view of a required resistance value, reliability and the like.

Further, the in the above-mentioned embodiments, although silicone group oil is used as the index matching medium 13, there may be used as the index matching medium 13 any liquid index matching material having a refractive index approximated to that of the cores 1, that is, the material may be appropriately selected.

Further, in the above-mentioned embodiment, although the cover 15 made of glass is used for sealing the slit 12, there may be used for the cover 15, various materials such as glass materials including quartz glass and crystallized glass, silicon carbide, silicon nitrate, ceramics such as alumina, a single crystal material such as silicon, a resin material, and a metal material. The material from which the cover 15 is formed may be appropriately selected in view of a joint strength with respect to a waveguide film or a difference in thermal expansion from that of the substrate 7, and required reliability and the like.

Further, in the above-mentioned embodiments, although the cover 15 is bonded with the use of an adhesive or low melting point glass seal, as to the method of joining the cover 15 to the substrate 7, there may be used various joint methods such as anode joint, diffusion joint, thermo compression bonding, soldering and the like. The method may be appropriately selected in view of, the material of the cover 15, a joint strength with respect to the waveguide film, required reliability and the like.

Further, in the above-mentioned embodiments, nitrogen gas or argon gas is used as the gas 14, the gas 14 should not be limited to the aforementioned gas, but there may be used any of various gas materials such as inert gas having a stable characteristic. It may be appropriately selected in view of required reliability, costs and the like.

Further, in the above-mentioned embodiments, the optical waveguide removal portions 5 and the substrate removal portions 4 are formed in the vicinity of the phase adjusting means 8a, 8a', 8b, 8b' so as to relieve stress in the connection optical waveguides 1e, 1f in the zone where the phase adjusting means are formed. However, there may be used stress applying means for increasing (adding) stress applied to the optical guide waves in the parts where the phase adjusting means are formed.

Further, in the above-mentioned embodiment, instead of copper used for the metal thin films, there may be selected a suitable material in view of a temperature at which the joint is possible, a heat-proof temperature, usable temperature and the like of the optical waveguide layer and the heaters.

Further, if, for example, the desired value of the PDL to be constrained is small and so forth, the means for relieving or increasing stress applied to the optical guide wave in the part where the phase adjusting means is formed, may be eliminated. In this case, the light attenuation value may be accurately changed in a range of, for example, 1 to 10 dB by the phase adjusting means formed in the Mach-Zehnder interferometer circuit 30, and further, a large attenuation value such as not less than 35 dB may be obtained through the operation of the optical shutter portion 50 side.

Further, the positions where the first to fourth phase adjusting means 8a, 8b, 8a', 8b' should not be limited to those explained in the second embodiment, that is, it may be satisfactory if the first and fourth phase adjusting means 8a, 8b' are formed in the first connection optical waveguide 1e, and the second and third phase adjusting means 8b, 8a' are formed in the second connection optical waveguide 1f.

Further, in the above-mentioned embodiment, although the phase adjusting means are formed respectively in the two connection optical waveguides 1e, 1f, the phase adjusting means may be formed only one of the connection optical waveguides. Further, the number of the phase adjusting means formed in the waveguides should not be limited to one or two for each, but may be appropriately set.

Further, in the above-mentioned embodiment, although the slit 12 is formed so as to cross the output optical waveguide, the slit 12 may be formed so as to cross the input optical waveguide.

According to the present invention as stated above, a light attenuation value may be accurately obtained in a range of for example, 0 to 10 dB by adjusting the phase of the Mach-Zehnder interferometer circuit constituted by the cores in the optical waveguide layer, and further, such a condition that a very high light attenuation value of about not less than 35 dB is obtained may be obtained by providing the liquid index matching medium having a refractive index approximated to that of the cores, in a part of the slit crossing the longitudinal intermediate part of the single output optical waveguide in the Mach-Zehnder interferometer circuit and by displacing the index matching medium in the slit to the position retracted from the path of the light beam transmitted through the output optical waveguide.

Further, according to the present invention, with the configuration such that the variation rates of polarization difference between the phases of the light beams transmitted through the two connection optical waveguides provided respectively therein with the phase adjusting means are different from each other when the phase adjustment are made by the phase adjusting means, the light attenuation value may be accurately controlled up to a high value with a low PDL by controlling the two phase adjusting means so that the polarization differences of the phases of the light beams transmitted respectively through the connection optical waveguides are equal to each other.

Further, according to the present invention, with a configuration such that variation rates of birefringence of the two connection optical waveguides provided respectively therein with the phase adjutant means are different from each other when the phase adjustment is made by the phase adjusting means, the light attenuation value may be controlled up to a higher value with a low PDL by controlling the two phase adjusting means so as to obtain such birefringence rates that the polarization differences of the phases of the light beams transmitted respectively through the connection optical waveguides are equal to each other.

Further, according to the present invention, with the configuration which is provided in the vicinity of the part of at least one of the two connection optical waveguides which are provided therein with the phase adjusting means, and in which stress applied to the connection optical waveguide is relieved or increased when the phase adjustment is made by the phase adjusting means, since the stress is relieved or increased, variation rates of the birefringence rate of the connection optical waveguide may be easily set.

Further, according to the present invention, with such a configuration that the part of at least one of the connection optical waveguides, in which the phase adjusting means is formed, is adjacent the free space for relieving stress applied to the connection optical waveguide when the phase adjustment being made by the phase adjusting means, with a space therebetween, the variation rates of birefringence rates with respect to phase adjusting values upon the phase adjustment by the two phase adjusting means may be set to values which are different from each other through the relieving of the stress.

Further, according to the present invention, with such a configuration that the heat insulation means for constraining the heat applied to the two connection optical waveguides provided respectively therein with the phase adjusting means formed of the heating means, from being transmitted to the outside of the zone around the phase adjusting means is provided in the vicinity of at least one of the phase adjusting means, the connection optical waveguides in the zones where the phase adjusting means are formed, may be efficiently heated, thereby it is possible aim at reducing power consumption.

Further, according to the present invention, with such a configuration that the optical waveguide layer on opposite sides interposing therebetween the part where the phase adjusting means are formed, is removed in the zones spaced from the connection optical waveguides, along the connection optical waveguides, from the front surface of the optical waveguide layer toward the front surface of the substrate, and the thus formed optical waveguide removal portions constitutes means for reliving stress in the free space, the means for relieving stress in the free space may be easily and appropriately formed.

Further, according to the present invention, with a configuration such that the two connection optical waveguides are formed therein with phase adjusting means, and the distance between one of the phase adjusting means and the optical waveguide removal portion adjacent this phase adjusting means is different from the distance between the other one of the phase adjusting means and the optical guide wave removal portions adjacent thereto, a difference between variation rates of birefringence rates of the connection optical waveguides may be appropriately obtained when the phase adjustment is made by one and the other of the phase adjusting means.

Further, according to the present invention, with such a configuration that the optical waveguide layer on opposite sides interposing therebetween the part where the phase adjusting means are formed, is removed in the zones spaced from the connection optical waveguides, along the connection optical waveguides, from the front surface of the optical waveguide layer toward the front surface of the substrate, and the thus formed waveguide removal portions serve as heat insulation means, the heat insulation means may be easily and appropriately formed by the optical waveguide removal portions, thereby the zones where the phase adjusting means are formed may be efficiently heated.

Further, according to the present invention, with such a configuration that one of the connection optical waveguides which are arranged in parallel with each other constitutes the first connection optical waveguide while the other one of them constitutes the second connection optical waveguide, and the phase adjusting means are formed in the first and second connection optical waveguides, two for each, being spaced from each other in the longitudinal direction with the distances between the phase adjusting means and the optical waveguide removal portions being set to the first and second distances, the polarization dependency of the light attenuation value of the transmitted light may be substantially eliminated by appropriately setting the first and second distances, thereby it is possible to aim at reducing power consumption.

Further, according to the present invention, with a configuration that the optical guide wave removal portions are formed by removing the optical waveguide layer from the front surface thereof to the front surface of the substrate, stress relief and heat insulation may be efficiently made in the connection optical waveguides in the zones where the phase adjusting means are formed.

Further, according to the present invention, with such a configuration that the substrate removal portions are formed by removing the substrate in the parts of the front surface of the substrate, which face the lower parts of the optical waveguide removal portions, stress relief and heat insulation may be more efficiently made in the connection optical waveguides in the zones where the phase adjusting means are formed.

Further, according to the present invention, with such a configuration that the substrate removal portions are recesses having rectangular shapes formed by cutting the substrate in the direction in which the lower parts of the optical waveguide removal portions become wider than the spaces between the opposite surfaces of the optical guide wave removal portions, stress relief and heat insulation may be more efficiently made in the connection optical waveguides in the zones where the phase adjusting means are formed.

Further, according to the present invention, the matching medium displacing means is the thin film heaters formed in the vicinity of the slit, the matching medium displacing means may be easily formed, and the index matching medium may be appropriately displaced.

Further, according to the present invention, with such a configuration that the phase adjusting means are the thin film heaters formed on the connection optical waveguides, the phase adjusting means may be easily formed, and the phases of the light beams transmitted through the connection optical waveguides may be easily changed through thermooptical effect.

Further, according to the present invention, with such a configuration that the optical waveguide layer is formed of quart group glass, a planar optical waveguide circuit type variable attenuator having a low insertion loss and high reliability may be practically provided.

Further, according to the present invention, with such a configuration that the substrate is a silicon substrate, there may be materialized a planar optical waveguide circuit type variable attenuator which has satisfactory heat dissipation and high reliability, and which can easily relieve stress from the connection optical waveguides in the zone where the phase adjusting means are formed.

Further, according to the present invention, with such a configuration that the slit is sealed by the glass plate, there may be materialized a planar optical waveguide circuit type variable attenuator which may easily confirm the condition of displacement of the index matching medium and which has high reliability.

Further, according to the present invention, with such a configuration that the glass plate is bonded to the optical waveguide layer around the slit with the use of an adhesive, the slit may be easily sealed.

Further, according to the present invention, the glass plate is joined to the optical waveguide layer around the slit with the use of low melting point glass, the slit may be easily sealed, and the reliability may be further enhanced.

Further, according to the present invention, with such a configuration that the glass plate is joined to the optical waveguide layer through diffusion joint between the metal films formed on the glass plate and the front surface of the optical waveguide layer, higher reliability may be obtained.

Further, according to the present invention, with such a configuration that the glass plate is joined through the diffusion joint between the metal films made of copper or copper alloy, the sealing may be made with high reliability with no affection upon the characteristics of the optical waveguides.

Further, according to the present invention, with such a configuration that the inert gas is enclosed in the slit together with the index matching medium, higher reliability may be exhibited.

The invention claimed is:

1. A planar optical waveguide circuit variable attenuator having a substrate and an optical waveguide layer having cores and a clad formed on the substrate, which comprises:
    a Mach-Zehnder interferometer circuit having, in the cores, at least one input optical waveguide, an optical branch portion for causing branching of a light beam inputted from the input optical waveguide, at least one output optical waveguide, an optical coupling portion provided on the input side of the output optical waveguide, and two connection optical waveguides connecting the optical coupling portion with the optical branch portion and arranged being spaced from and in parallel with each other;
    phase adjusting means provided in at least one of the two connection optical waveguides, for adjusting a phase of a transmitted light beam;
    a slit formed in the optical waveguide layer, in a direction which crosses a longitudinally intermediate part of at least one of the input optical waveguide and the output optical waveguide;
    a liquid index matching medium charged in a part of the slit and having a refractive index approximated to that of the cores; and
    a matching medium displacing means for displacing the index matching medium to either a position which includes an optical path of a light beam in at least one of the input optical waveguide and the output optical waveguide, or a position which is retracted from the optical path, wherein
    one of the two connection optical waveguides which are spaced from and in parallel with each other is a first connection optical waveguide, and the other one of the two connection optical waveguides is a second connection optical waveguide,
    the first connection optical waveguide is formed therein with first and fourth phase adjusting means serving as the phase adjusting means, which are spaced from each other in the longitudinal direction and are arranged in that order,
    the second connection optical waveguide is formed therein with second and third phase adjusting means serving as the phase adjusting means, which are spaced from each other in the longitudinal direction and are arranged in that order,
    the first phase adjusting means has the same configuration as that of the third phase adjusting means,
    the second phase adjusting means has the same configuration as that of the fourth phase adjusting means,
    a first recess is formed as the optical waveguide removal portion on one side of the first phase adjusting means, at a first distance therefrom,
    a third recess is formed as the optical waveguide removal portion on one side of the third phase adjusting means, at a third distance therefrom, which is substantially equal to the first distance,
    a second recess is formed as the optical waveguide removal portion on one side of the second phase adjusting means at a second distance therefrom, which is different from the first distance, and
    a fourth recess is formed as the optical waveguide removal portion on one side of the fourth phase adjusting means at a fourth distance therefrom, which is substantially equal to the second distance.

2. A planar optical waveguide circuit variable attenuator as set forth in claim 1, wherein the phase adjusting means provided respectively in the two connection optical waveguides are phase control means for carrying out phase control such that variation rates of polarization differences of the phases of light beams transmitted through the two connection optical waveguides are made to be different from each other.

3. A planar optical waveguide circuit variable attenuator as set forth in claim 2, wherein the phase adjusting means provided respectively in the two connection optical waveguides are birefringence rate adjusting means for causing variation rates of polarization differences of the two connection optical waveguides to be different from each other.

4. A planar optical waveguide circuit variable attenuator as set forth in claim 3, wherein, being spaced from a zone where the phase adjusting means is formed in at least one of the two connection optical waveguides, there is provided a stress adjusting means for relieving or increasing stress applied to the connection optical output waveguide when phase adjustment is made by the phase adjusting means.

5. A planar optical waveguide circuit variable attenuator as set forth in claim 4, wherein the stress adjusting means is a free space for relieving the stress applied to the connection optical waveguide when phase adjustment is made by the phase adjusting means, which is formed in the optical waveguide layer, said free space being spaced from the phase adjusting means.

6. A planar optical waveguide circuit variable attenuator as set forth in any one of claims 1 to 4, wherein the two connection optical waveguides are formed respectively therein with the phase adjusting means having heating means, and a heat insulation means for constraining diffusion of heat which is applied to the connection optical waveguides by the heating mans is provided in a zone spaced from at least one of the phase adjusting means.

7. A planar optical waveguide circuit variable attenuator as set forth in claim 5, wherein the free space in zone is spaced from the connection optical waveguide in a longitudinal direction of the connection optical waveguide.

8. A planar optical waveguide circuit variable attenuator as set forth in claim 7, wherein the two connection optical waveguides are formed respectively therein with the phase adjusting means, and there are provided the optical waveguide removal portion formed at a first distance from one of the optical connection waveguides, and the optical waveguide removal portion formed at a second distance which is different from the first distance, from the other one of the connection optical waveguides.

9. A planar optical waveguide circuit variable attenuator as set forth in claim 6, wherein the heat insulation means are optical waveguide removal portions which are formed by removing the optical waveguide layer along the longitudinal direction of the connection optical waveguides in zones spaced from the connection optical waveguides.

10. A planar optical waveguide circuit variable attenuator as set forth in claim 1, wherein the optical waveguide removal portions are formed by removing the optical waveguide layer from a surface of the optical waveguide layer to a front surface of the substrate.

11. A planar optical waveguide circuit variable attenuator as set forth in claim 10, wherein substrate removal portions are formed as being continuous from the lower parts of the optical waveguide removal portions.

12. A planar optical waveguide circuit variable attenuator as set forth in claim 11, wherein the substrate removal portion has recess-like cross-sectional shape, having a part that is wider than that of the lower part of the optical waveguide removal portion.

13. A planar optical waveguide circuit variable attenuator as set forth in claim 12, wherein the matching medium displacing means includes a thin film heater provided around at least a part of the slit.

14. A planar optical waveguide circuit variable attenuator as set forth in claim 13, wherein the phase adjusting means include thin film heaters provided on the connection optical waveguides.

15. A planar optical waveguide circuit variable attenuator as set forth in claim 14, wherein the optical waveguide layer is made of quartz group glass.

16. A planar optical waveguide circuit variable attenuator as set forth in claim 15, wherein the substrate is a silicon substrate.

17. A planar optical waveguide circuit variable attenuator as set forth in claim 16, wherein the slit is sealed by a glass plate.

18. A planar optical waveguide circuit variable attenuator as set forth in claim 17, wherein the glass plate is bonded to the optical waveguide layer around the slit by an adhesive.

19. A planar optical waveguide circuit variable attenuator as set forth in claim 18, wherein the glass plate is joined to the optical waveguide layer around the slit by low melting point glass.

20. A planar optical waveguide circuit variable attenuator as set forth in claim 17, wherein a metal film is interposed between the glass plate and the optical waveguide layer, and the glass plate and the optical waveguide layer are joined to each other through diffusion of metal constituting the metal film.

21. A planar optical waveguide circuit variable attenuator as set forth in claim 20, wherein the metal film is made of copper or copper alloy.

22. A planar optical waveguide circuit variable attenuator as set forth in claim 21, wherein the slit is enclosed therein with inert gas together with the index matching medium.

* * * * *

UNITED STATES PATENT AND TRADEMARK OFFICE
CERTIFICATE OF CORRECTION

| | |
|---|---|
| PATENT NO. | : 7,233,714 B2 |
| APPLICATION NO. | : 11/352373 |
| DATED | : June 19, 2007 |
| INVENTOR(S) | : Kawashima et al. |

It is certified that error appears in the above-identified patent and that said Letters Patent is hereby corrected as shown below:

On the title page, Item (30), the Foreign Application Priority Data is incorrect. Item (30) should read:

--(30) Foreign Application Priority Data
Aug. 13, 2003   (JP).....................................2003-207503--

Signed and Sealed this

Seventh Day of August, 2007

JON W. DUDAS
*Director of the United States Patent and Trademark Office*